(12) United States Patent
Yamada

(10) Patent No.: US 10,897,622 B2
(45) Date of Patent: Jan. 19, 2021

(54) ENCODING DEVICE AND ENCODING METHOD

(71) Applicant: FUJITSU LIMITED, Kawasaki (JP)

(72) Inventor: Kohji Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/540,116

(22) Filed: Aug. 14, 2019

(65) Prior Publication Data

US 2020/0077098 A1 Mar. 5, 2020

(30) Foreign Application Priority Data

Aug. 31, 2018 (JP) .................................. 2018-163504

(51) Int. Cl.
*H04N 19/172* (2014.01)
*H04N 19/196* (2014.01)

(52) U.S. Cl.
CPC ......... *H04N 19/172* (2014.11); *H04N 19/196* (2014.11)

(58) Field of Classification Search
CPC ............................ H04N 19/172; H04N 19/196
USPC .................................................... 375/240.02
See application file for complete search history.

(56) References Cited

U.S. PATENT DOCUMENTS

| 2013/0101014 A1 | 4/2013 | Fu et al. |
| 2015/0262404 A1 | 9/2015 | Laude et al. |
| 2017/0243323 A1* | 8/2017 | Croxford ............. H04N 13/106 |

FOREIGN PATENT DOCUMENTS

| JP | 2-044883 | 2/1990 |
| JP | 2000-57354 | 2/2000 |

OTHER PUBLICATIONS

Wiegand, Thomas et al., "Overview of the H.264/AVC Video Coding Standard", IEEE Transactions on Circuits and Systems for Video Technology, Institute of Electrical and Electronics Engineers, vol. 13, No. 7, pp. 560-576, Jul. 1, 2003.
Extended European Search Report dated Jan. 21, 2020 for corresponding European Patent Application No. 19191436.5, 8 pages.

\* cited by examiner

*Primary Examiner* — Jeffery A Williams
(74) *Attorney, Agent, or Firm* — Fujitsu Patent Center

(57) ABSTRACT

An encoding device includes a memory, and a processor coupled to the memory and the processor configured to extract a first line-drawing region from a first image in a plurality of images, by replacing the first line-drawing region of the first image with an image which is included in a second image preceding the first image in the plurality of images and corresponds to the first line-drawing region, generate a third image, generate video encoding information by performing a video encoding processing based on the third image, generate line-drawing encoding information by performing a line-drawing encoding processing based on the first line-drawing region, and transmit the video encoding information and the line-drawing encoding information to a decoding device.

6 Claims, 23 Drawing Sheets

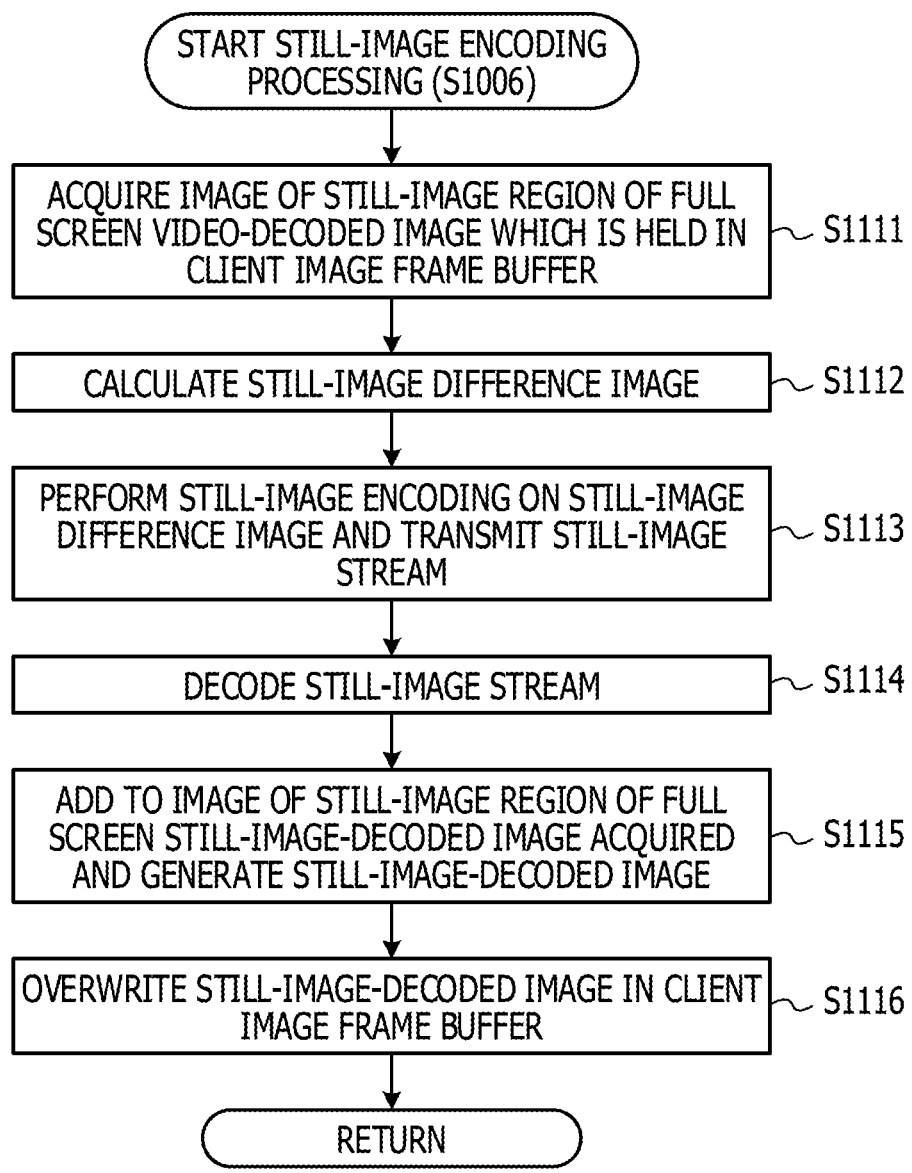

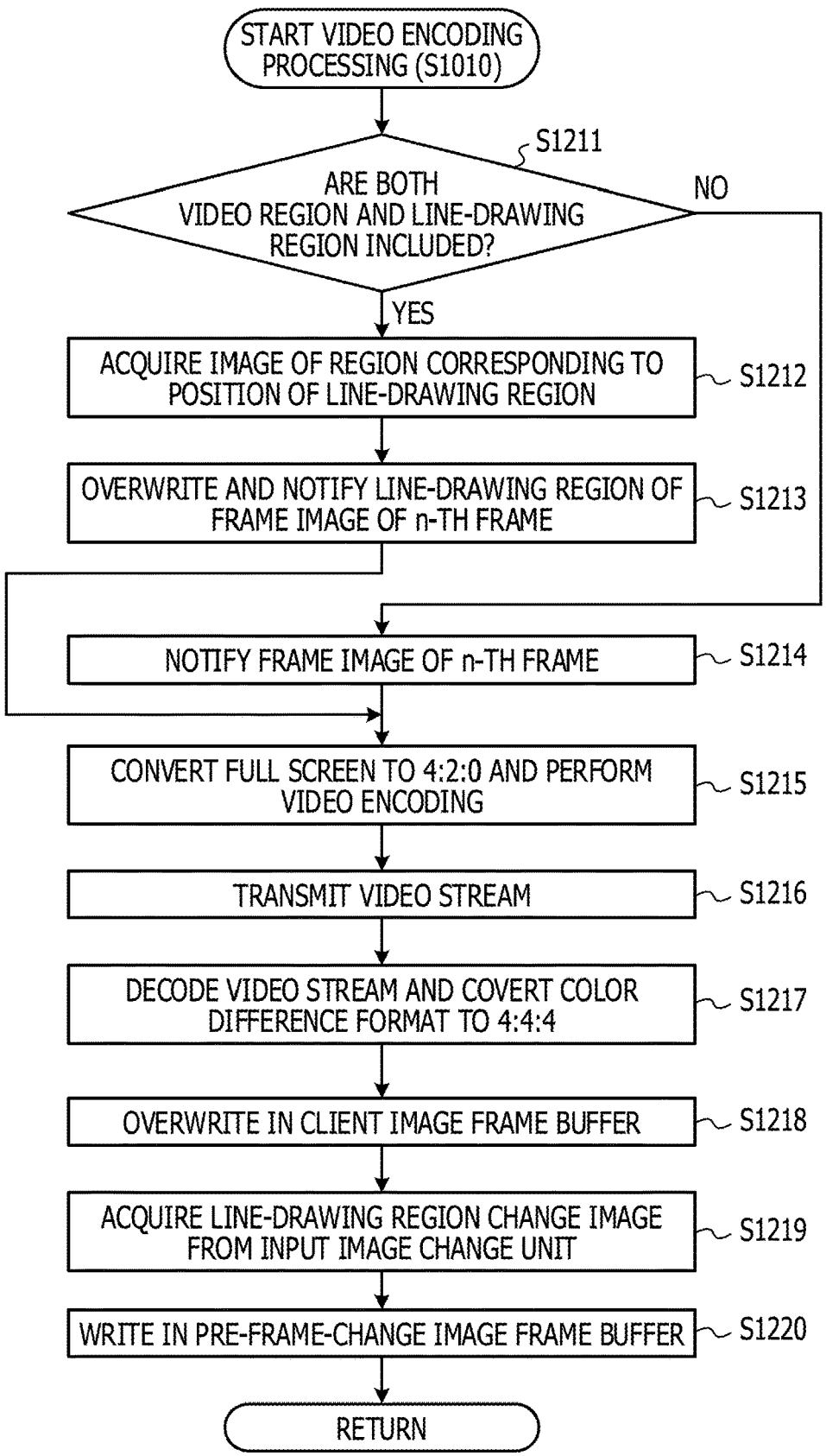

ENCODING DEVICE AND ENCODING METHOD

CROSS-REFERENCE TO RELATED APPLICATION

This application is based upon and claims the benefit of priority of the prior Japanese Patent Application No. 2018-163504, filed on Aug. 31, 2018, the entire contents of which are incorporated herein by reference.

FIELD

The embodiments discussed herein are related to an encoding technology.

BACKGROUND

A screen transfer processing for transferring an encoded screen image has carried out by various encoders including a video encoder capable of encoding a video and a line-drawing encoder suitable for encoding a line drawing such as CAD images, for several years, properly depending on a type of the screen image.

In video encoding with high compression performance, such as H. 264 or High Efficiency Video Coding (HEVC), processing load on the encoding is significantly high because of the complex processing. Accordingly, in a case where the processing is required to be carried out in real time, the video encoder is generally often implemented by a dedicated hardware. A video hardware encoder encodes a video frame by frame, thus even when a region other than the video is included in a frame image (for example, the frame image includes a video region and a line-drawing region), a video stream is generated for the entire frame image.

Meanwhile, the line-drawing encoder implemented by software is capable of generating a line-drawing stream by extracting the line-drawing region. Consequently, on a side of a decoding device, for example, a line drawing acquired by decoding the line-drawing stream is overwritten at a position of the line-drawing region in the frame image acquired by decoding the video stream, thereby generating the screen image.

For example, related arts are disclosed in Japanese Laid-open Patent Publication Nos. 2-44883 and 2000-57354.

SUMMARY

According to an aspect of the embodiments, an encoding device includes a memory, and a processor coupled to the memory and the processor configured to extract a first line-drawing region from a first image in a plurality of images, by replacing the first line-drawing region of the first image with an image which is included in a second image preceding the first image in the plurality of images and corresponds to the first line-drawing region, generate a third image, generate video encoding information by performing a video encoding processing based on the third image, generate line-drawing encoding information by performing a line-drawing encoding processing based on the first line-drawing region, and transmit the video encoding information and the line-drawing encoding information to a decoding device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11B is a second flowchart illustrating the details of each step in the encoding processing;

FIG. 12B is a fourth flowchart illustrating the details of each step in the encoding processing;

DESCRIPTION OF EMBODIMENTS

When the screen transfer processing in the conventional technology is performed, the video encoder and the line-drawing encoder encode the same line-drawing region in the frame image, thus the line-drawing region is transferred to the decoding device. Therefore, information volume of an encoded stream increases.

Hereinafter, the embodiments of the present disclosure are described with reference to the accompanying drawings. In the specification and drawings, constituent elements having substantially the same functional configuration are described with the same reference sign and the overlapping description thereof is omitted.

Figure 1:
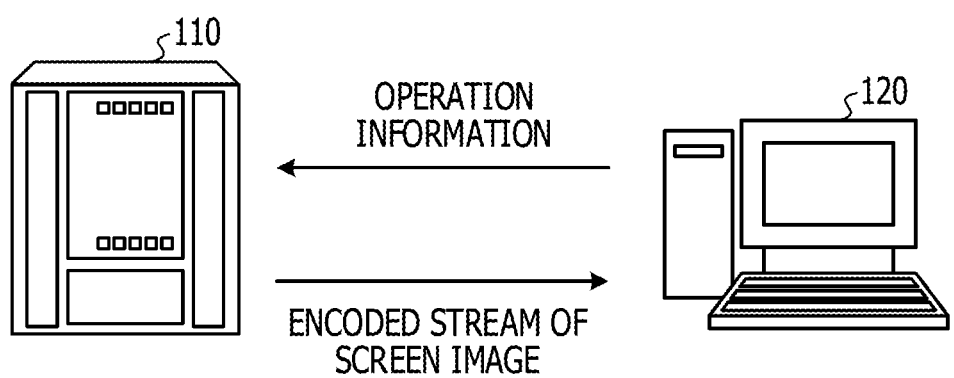
FIG. 1 is a diagram illustrating one example of a system configuration of a screen transfer system.

First, description is provided for a system configuration of a screen transfer system employing an encoding device according to a first embodiment. FIG. 1 is a diagram illustrating one example of the system configuration of the screen transfer system.

As illustrated in FIG. 1, a screen transfer system 100 includes a virtual desktop server 110 which is an encoding device according to the first embodiment, and a user terminal 120 which is communicably connected to the virtual desktop server 110.

The virtual desktop server 110 encodes an image of a screen (screen image) generated by executing various applications, and transmits an encoded stream to the user terminal. Accordingly, the user terminal 120 decodes the encoded stream received from the server and displays the screen image.

The virtual desktop server 110 receives operation information from the user terminal 120 in a case where a user operates the user terminal 120 and inputs various instructions to the applications in response to the transmission of the encoded stream.

By using the virtual desktop server 110 with a screen transfer function, the user does not have to store data in the user terminal when executing the various applications. With the screen transfer system 100, it is possible to inhibit information leakage from the user terminal 120 and to enhance security.

Figure 2A:
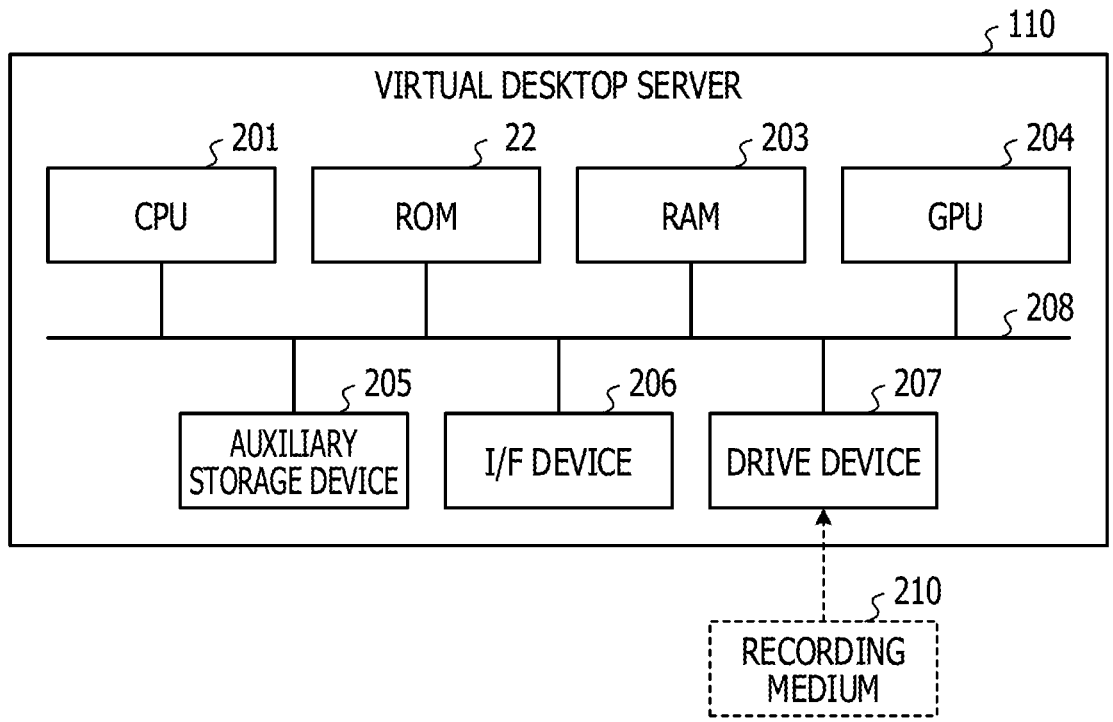
FIG. 2A is a diagram illustrating one example of a hardware configuration of a virtual desktop server.

A hardware configuration of each device (the virtual desktop server 110 and the user terminal 120) of the screen transfer system 100 will be described below. FIG. 2A is a diagram illustrating one example of the hardware configuration of the virtual desktop server.

As illustrated in FIG. 2A, the virtual desktop server 110 includes a central processing unit (CPU) 201, and a read only memory (ROM) 202. The virtual desktop server 110 also includes a random access memory (RAM) 203 and a graphics processing unit (GPU) 204. The CPU 201, the ROM 202, the RAM 203, and the GPU 204 constitute a so-called computer.

The virtual desktop server 110 further includes an auxiliary storage device 205, an interface (I/F) device 206, and a drive device 207. Moreover, the hardware components of the virtual desktop server 110 are coupled to each other via a bus 208.

The CPU 201 is a computation device that executes various programs (details will be described later) installed in the auxiliary storage device 205.

The ROM 202 is a non-volatile memory and functions as a main storage device. The ROM 202 stores various programs, data, and so on, to be used by the CPU 201 to run the various programs installed in the auxiliary storage device 205. Specifically, the ROM 202 stores a boot program and so on such as a Basic Input/Output System (BIOS) and an Extensible Firmware Interface (EFI).

The RAM 203 is a volatile memory such as a dynamic random access memory (DRAM) or a static random access memory (SRAM), and functions as a main storage device. The RAM 203 provides a work area on which the various programs installed in the auxiliary storage device 205 are expanded for execution by the CPU 201.

The GPU 204 is a computation device for image processing, and performs high-speed computation by parallel processing on various images when the CPU 201 executes the various programs. In the first embodiment, a video encoder is implemented by the GPU 204.

The auxiliary storage device 205 stores the various programs and information to be used when the CPU 201 executes the various programs. The I/F device 206 is a coupling device which is coupled to and communicates with the other devices (for example, the user terminal 120).

The drive device 207 is a device in which a recording medium 210 is set. The recording media 210 discussed herein include media which record information optically, electrically, and magnetically like a CD-ROM, a flexible disk, a magnetooptical disk, and so forth. In addition, the recording media 210 may also include a semiconductor memory and so on, such as a ROM and a flash memory, which record information electrically.

The various programs installed in the auxiliary storage device 205 are installed, for example, in such a way that a distributed recording medium 210 is set in the drive device 207, and the various programs recorded in the recording medium 210 is read by the drive device 207. Alternatively, the various programs installed in the auxiliary storage device 205 may be installed by downloading the programs from a network (omitted).

Figure 2B:
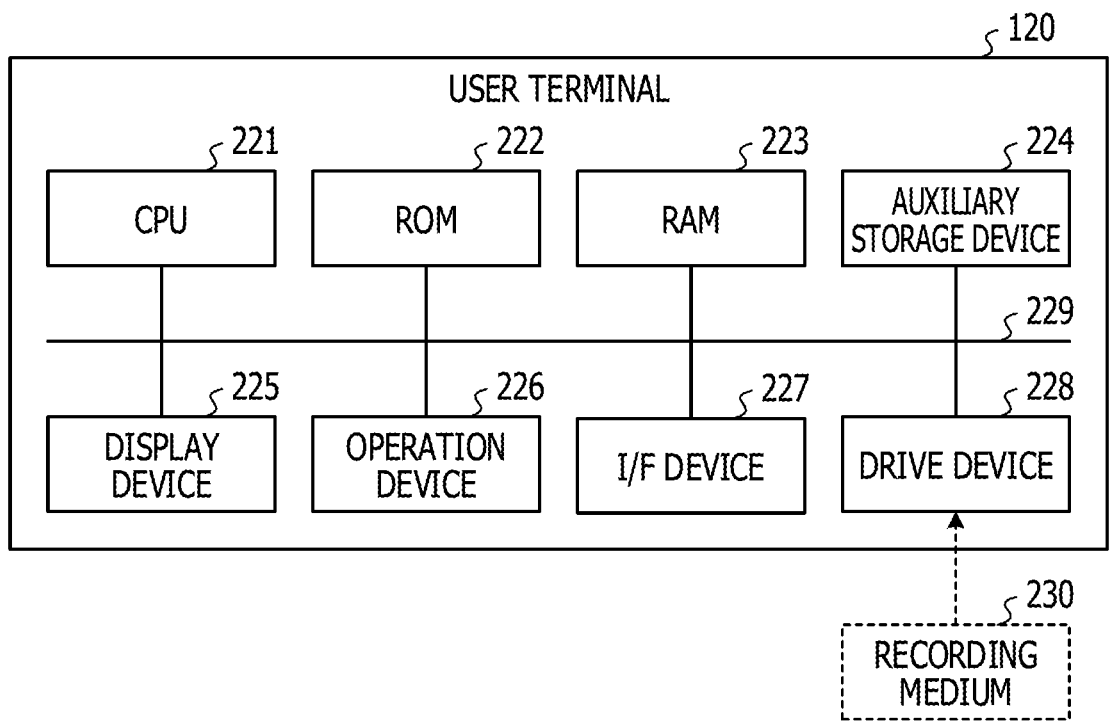
FIG. 2B is a diagram illustrating one example of a hardware configuration of a user terminal.

FIG. 2B is a diagram illustrating one example of the hardware configuration of the user terminal. Difference between FIGS. 2A and 2B is that a display device 225 and an operation device 226 are provided but the GPU 204 is not provided in the example of FIG. 2B. Therefore, the display device 225 and the operation device 226 will be described herein.

The display device 225 is a display device which displays the screen image transmitted from the virtual desktop server 110 and decoded by the user terminal 120. The operation device 226 is an operation device to be used by the user of the user terminal 120 to input various instructions.

Figure 3A:
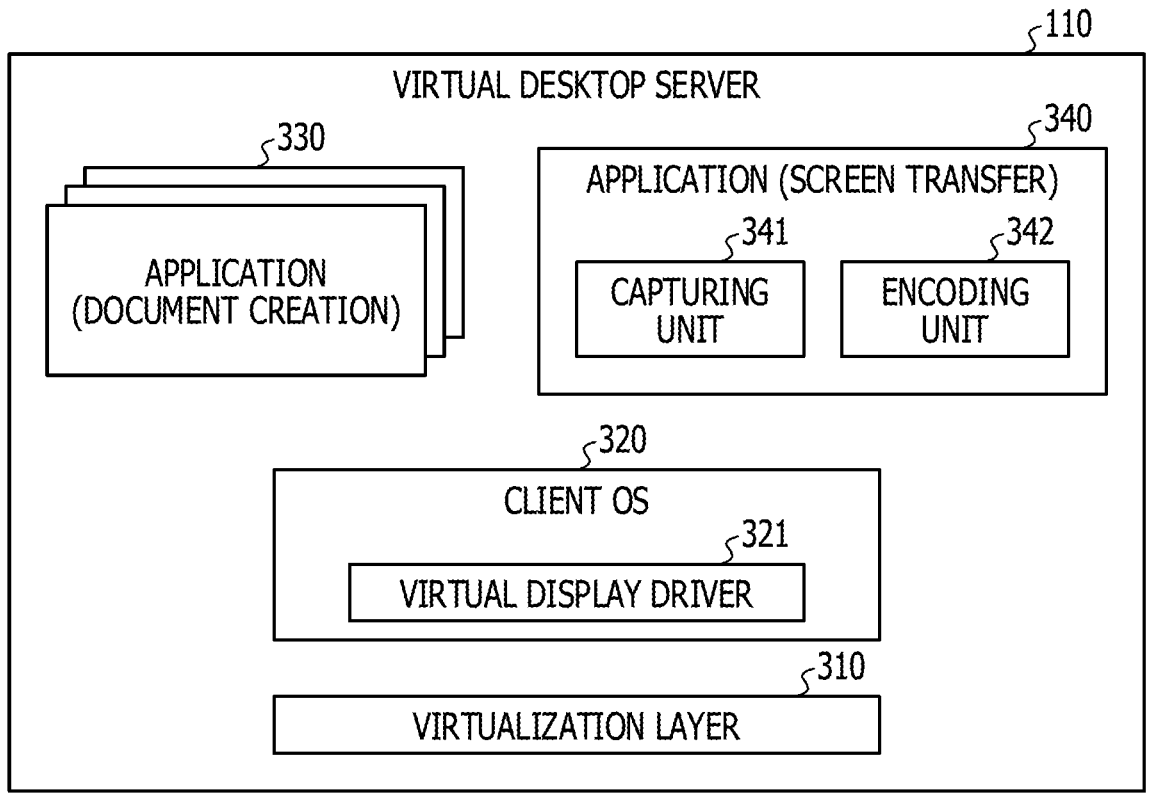
FIG. 3A is a diagram illustrating one example of a software configuration of the virtual desktop server.

A software configuration of each device (the virtual desktop server 110 and the user terminal 120) of the screen transfer system 100 will be described below. FIG. 3A is a diagram illustrating one example of the software configuration of the virtual desktop server.

As illustrated in FIG. 3A, the virtual desktop server 110 includes a virtualization layer 310, a client operation system (OS) 320, an application 330, and an application 340.

The virtualization layer 310 is a software which virtualizes the virtual desktop server 110, and allows a plurality of OSs to share and use resources possessed by the virtual desktop server 110.

The client OS 320 is a guest operating system (OS) operating on the virtualization layer 310. The client OS 320 includes a virtual display driver 321, in which the screen image generated by the application 330 is written during execution of the application 330.

The application 330 is a software used by the user of the user terminal 120. A document creation software is illustrated in the example of FIG. 3A; however, the software executed on the virtual desktop server 110 is not limited to the document creation software. A random software is assumed to be executed on the virtual desktop server 110.

The application 340 is a software for screen transfer, which includes a capturing unit 341 and an encoding unit 342. The capturing unit 341 captures the screen image written in the virtual display driver 321. The encoding unit 342 encodes the screen image captured by the capturing unit 341, and transmits the encoded stream to the user terminal 120.

Figure 3B:
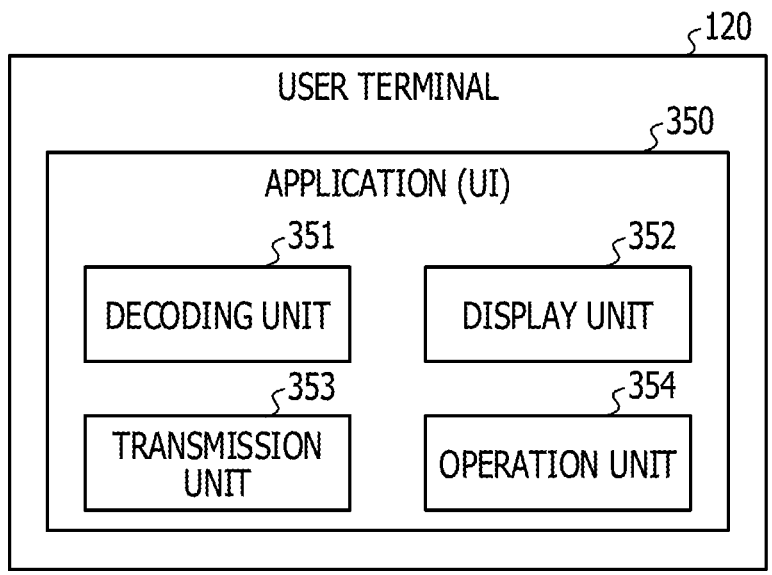
FIG. 3B is a diagram illustrating one example of a software configuration of the user terminal.

FIG. 3B is a diagram illustrating one example of the software configuration of the user terminal. As illustrated in FIG. 3B, the user terminal 120 includes an application 350 for user interface (UI).

The application 350 includes a decoding unit 351, a display unit 352, a transmission unit 353, and an operation unit 354. The decoding unit 351 generates the screen image by decoding encoded data transmitted from the virtual desktop server 110 and notifies the display unit 352 of the screen image. The display unit 352 controls to display the notified screen image on the display device 225 of the user terminal 120.

The operation unit 354 receives instructions in a case where the user of the user terminal 120 inputs the instructions to the application 330 via the operation device 226 in response to the screen image displayed on the display device 225. The transmission unit 353 transmits the instructions received by the operation unit 354 to the virtual desktop server 110 as operation information.

The encoding processing by the virtual desktop server 110 will be described. Further, a server of a comparative example will be described first in order to describe the encoding processing by the virtual desktop server 110. The outline of the encoding processing by the server of the comparative example will be described, and then information volume of an encoded stream generated by the server of the comparative example will be described. Thereafter, the outline of the encoding processing by the virtual desktop server 110 and information volume of the encoded stream generated by the virtual desktop server 110 will be described.

Figure 4:
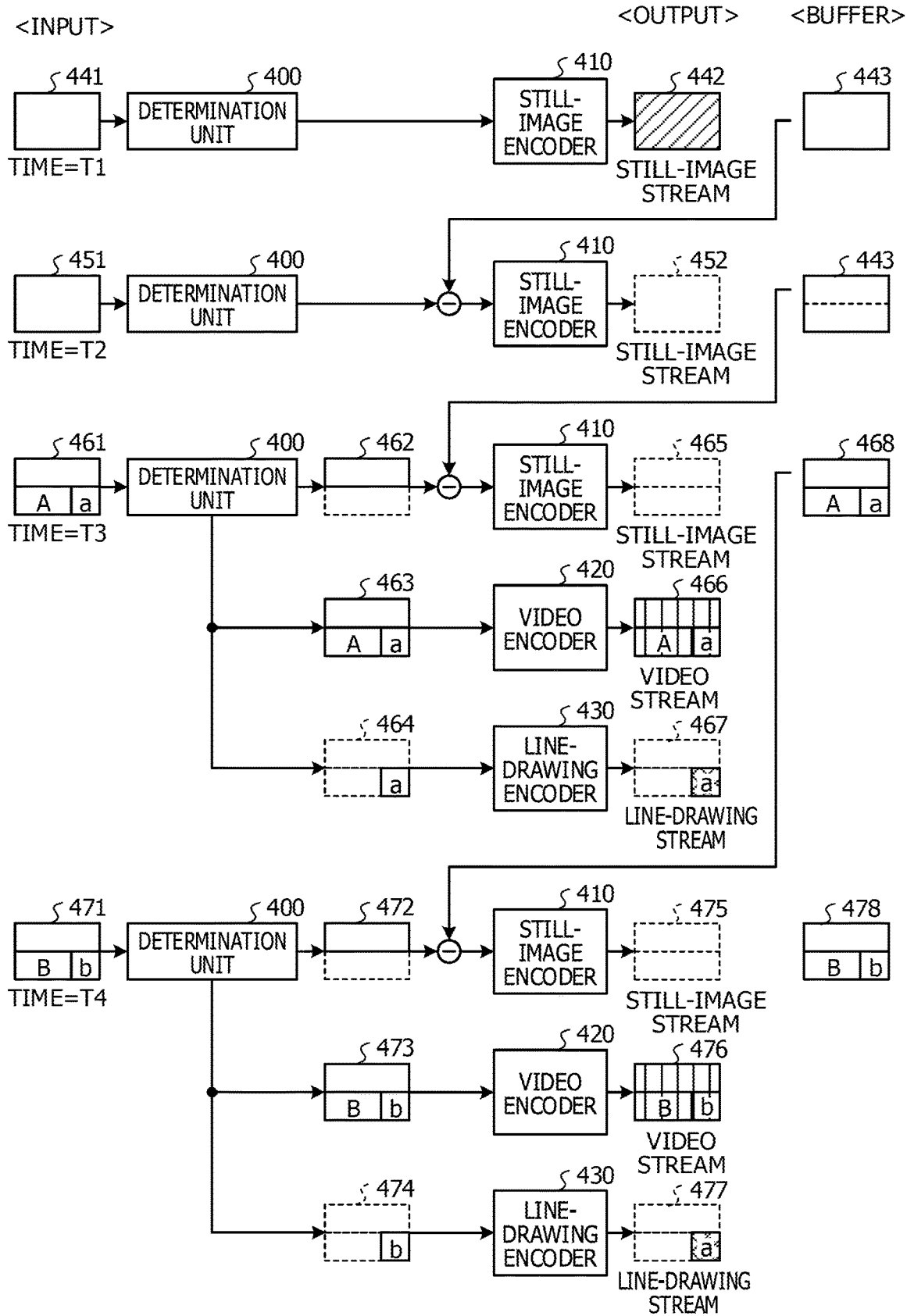
FIG. 4 is a diagram illustrating an outline of an encoding processing by a server of a comparative example.

FIG. 4 is a diagram illustrating an outline of the encoding processing by the server of the comparative example. As illustrated in FIG. 4, the server of the comparative example includes a determination unit 400, a still-image encoder 410, a video encoder 420, and a line-drawing encoder 430.

In the server of the comparative example, when the screen image is input to the encoding unit, the determination unit 400 determines whether or not there is a still-image region, a video region, or a line-drawing region for each frame image. The still-image encoder 410 performs still-image encoding on an image in the still-image region to generate a still-image stream (still-image encoded information) for each frame image. The video encoder 420 performs video encoding on the entire frame image to generate a video stream (video encoding information). Further, the line-drawing encoder 430 performs line-drawing encoding on an image in the line-drawing region to generate a line-drawing stream (line-drawing encoding information).

The screen image is "input" in the example of FIG. 4. The example of FIG. 4 indicates that frame images 441, 451, 461 and 471 are generated by the application 340 at respective times and input to the encoding unit.

Blank regions in the frame images 441, 451, 461 and 471 indicate the still-image regions. Further, regions indicated by "A" and "B" in the frame images 441, 451, 461 and 471 indicate video regions ("A" and "B" are different videos; it means that the image is changed). Moreover, regions indicated by "a" and "b" in the frame images 441, 451, 461 and 471 indicate line-drawing regions ("a" and "b" are different line drawings; it means that the image has been changed).

When the frame image 441 is input at a time T1, the determination unit 400 determines that the frame image 441 includes the still-image region. The still-image encoder 410 performs the still-image encoding on an image in the still-image region of the frame image 441 (that is, the frame image 441) to generate and output a still-image stream 442. At this time, a decoded image acquired by decoding the frame image 441 subjected to the encoding processing (in this case, a decoded image 443 (the same as the frame image 441) acquired by decoding the still-image stream 442) is held in a buffer.

When the frame image 451 is input at a time T2, the determination unit 400 determines that the frame image 451 includes the still-image region. Difference between the decoded image 443 (its image of the still-image region) held in the buffer and the image in the still-image region of the frame image 451 (that is, the frame image 451) is calculated, and then a still-image difference image is input to the still-image encoder 410.

The image in the still-image region is not changed, thus the frame image 451 is the same as the frame image 441. As described above, the decoded image 443 held in the buffer is the same as the frame image 441. Therefore, the still-image difference image acquired from the difference between the decoded image 443 and the frame image 451 is zero, thus the still-image encoder 410 outputs NULL data as a still-image stream 452. At this time, a decoded image acquired by decoding the frame image 451 subjected to the encoding processing (in this case, the decoded image 443 (the same as the frame image 441)) is held the buffer.

When the frame image 461 is input at a time T3, the determination unit 400 determines that the frame image 461 includes the still-image region. Consequently, a still-image difference image acquired from difference between an image 462 in the still-image region and an image at a position corresponding to a position of the still-image region of the decoded image 443 held in the buffer, is input to the still-image encoder 410.

Since the image in the still-image region is not changed, the still-image difference image has the information volume of zero, thus the still-image encoder 410 outputs NULL data as a still-image stream 465.

Further, when the frame image 461 is input at the time T3, the determination unit 400 determines that the frame image 461 includes the video region. Therefore, the entire frame image 463 (that is, the frame image 461) is input to the video encoder 420. Consequently, the video encoder 420 performs the video encoding on the entire frame image 463 to generate a video stream 466.

Further, when the frame image 461 is input at the time T3, the determination unit 400 determines that the frame image 461 includes the line-drawing region. Therefore, an image 464 in the line-drawing region is input to the line-drawing encoder 430. Consequently, the line-drawing encoder 430 performs the line-drawing encoding on the image 464 in the line-drawing region of the frame image 461 to generate and output a line-drawing stream 467.

A decoded image acquired by decoding the frame image 461 subjected to the encoding processing (in this case, a decoded image 468 (the image 462 in the still-image region, an image in the video region, and the image 464 in the line-drawing region)) is held the buffer.

When the frame image 471 is input at a time T4, the determination unit 400 determines that the frame image 471 includes the still-image region. Consequently, the still-image difference image acquired from difference between the image 472 in the still-image region and an image at a position corresponding to a position of the still-image region of the decoded image 468 held in the buffer, is input to the still-image encoder 410.

Since the still-image region is not changed, the still-image difference image has the information volume of zero, thus the still-image encoder 410 outputs NULL data as a still-image stream 475.

Further, when the frame image 471 is input at the time T4, the determination unit 400 determines that the frame image 471 includes the video region. Therefore, a frame image 473 (that is, the frame image 471) is input to the video encoder 420. Consequently, the video encoder 420 performs the video encoding on the frame image 473 to generate a video stream 476.

Further, when the frame image 471 is input at the time T4, the determination unit 400 determines that the frame image 471 includes the line-drawing region. Therefore, an image 474 in the line-drawing region is input to the line-drawing encoder 430. Consequently, the line-drawing encoder 430 performs the line-drawing encoding on the image 474 in the line-drawing region of the frame image 471 to generate and output a line-drawing stream 477.

A decoded image acquired by decoding the frame image 471 subjected to the encoding processing (in this case, a decoded image 478 (the image 472 in the still-image region, an image in the video region, and the image 474 in the line-drawing region)) is held in the buffer.

Figure 5:
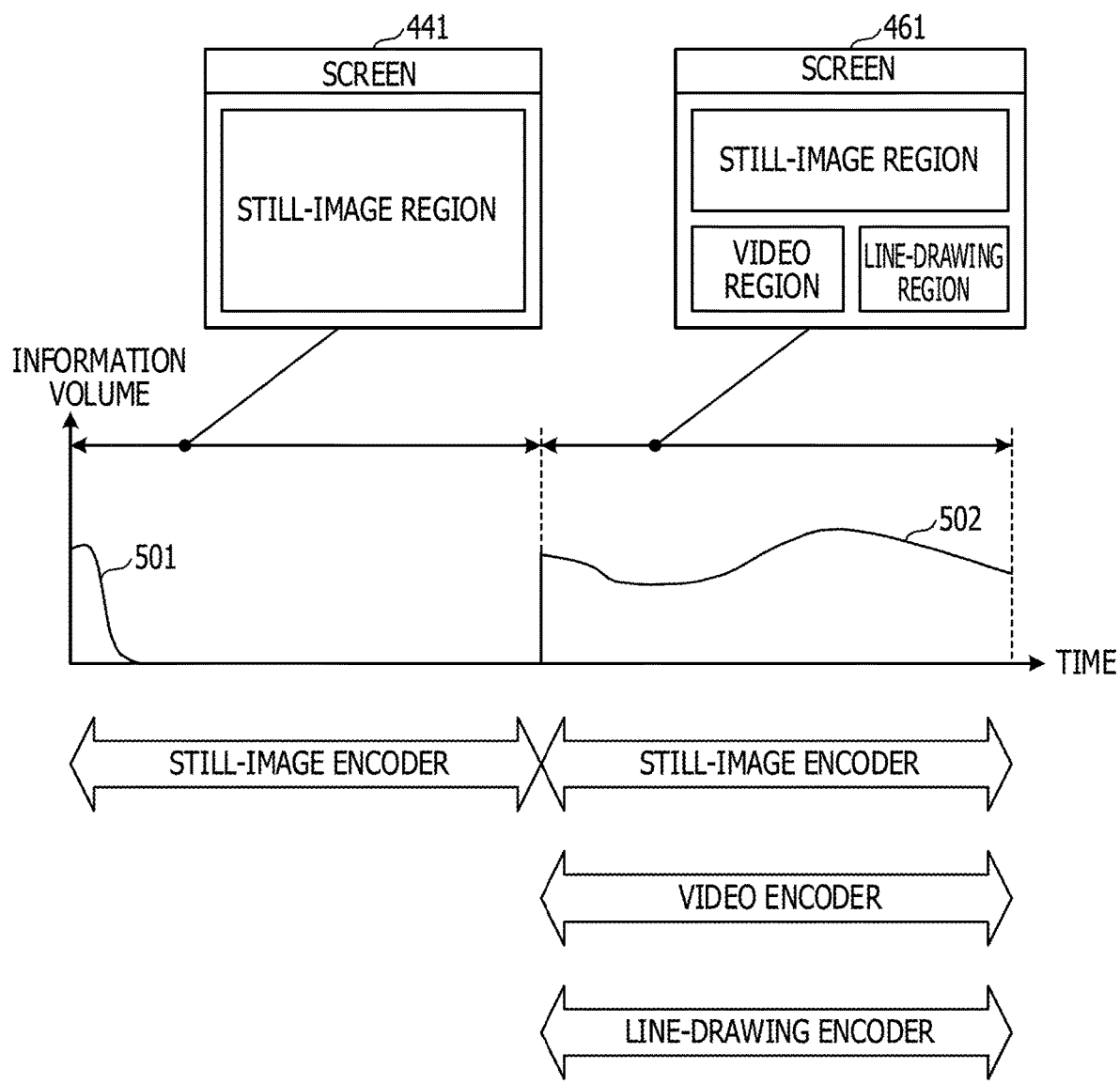
FIG. 5 is a diagram illustrating information volume of an encoded stream generated in the encoding processing by the server of the comparative example.

FIG. 5 is a diagram illustrating information volume of the encoded stream generated in the encoding processing by the server of the comparative example. A horizontal axis is the time, and a vertical axis is the information volume.

As illustrated in FIG. 5, in a case of the server of the comparative example, the still-image encoder 410 performs the still-image encoding on the image in the still-image region to generate the still-image stream 442 immediately after the frame image 441 of the screen image is generated, whereby the information volume is increased (see reference number 501).

On the other hand, in the server of the comparative example, the still-image encoder 410 subsequently encodes the difference between the decoded image held in the buffer and the image in the still-image region. Therefore, when the frame image in which the entire frame image is the still-image region continues, the still-image stream has the information volume of zero.

When a predetermined time has elapsed and the frame image 461 is generated, the information volume increases again (see reference number 502). It is because the video encoder 420 generates the video stream by encoding the entire frame image 461, and the line-drawing encoder generates the line-drawing stream by encoding the line-drawing region. Also at this time, since the image in the still-image region is not changed, the still-image stream has the information volume of zero.

Further, even after the frame image 461 is generated, the image in the video region and the image in the line-drawing region change with time. Therefore, the video stream generated by performing the video encoding on the entire frame image with the video encoder 420 has a certain extent of information volume. Similarly, the line-drawing stream generated by performing the line-drawing encoding on the image in the line-drawing region with the line-drawing encoder 430 has a certain extent of information volume. Consequently, even after the frame image 461 is generated, the information volume of the encoded stream generated in the encoding processing by the server of the comparative example is maintained high (see reference number 502).

Figure 6:
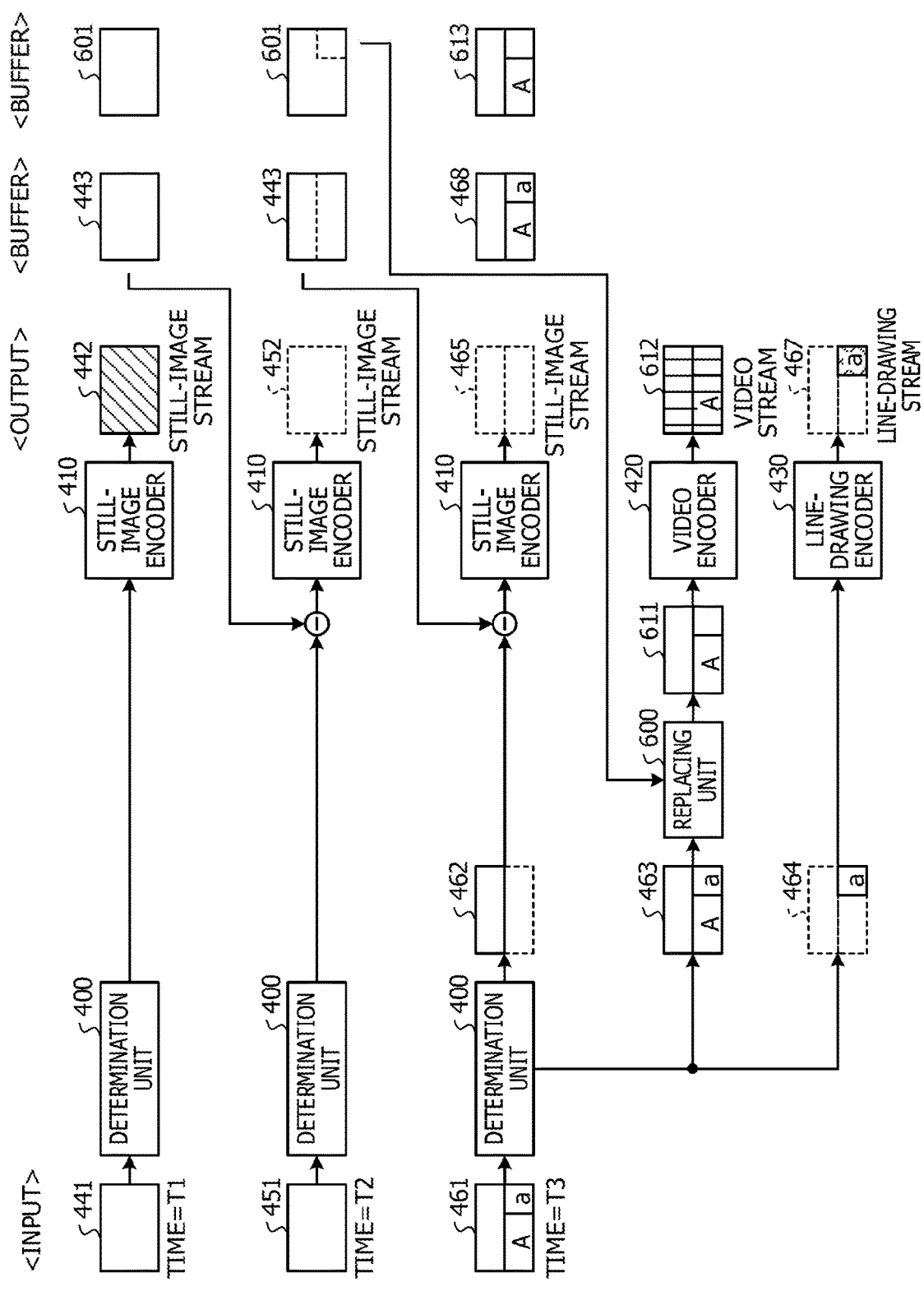
FIG. 6 is a first diagram illustrating an outline of an encoding processing by the virtual desktop server.
Figure 7:
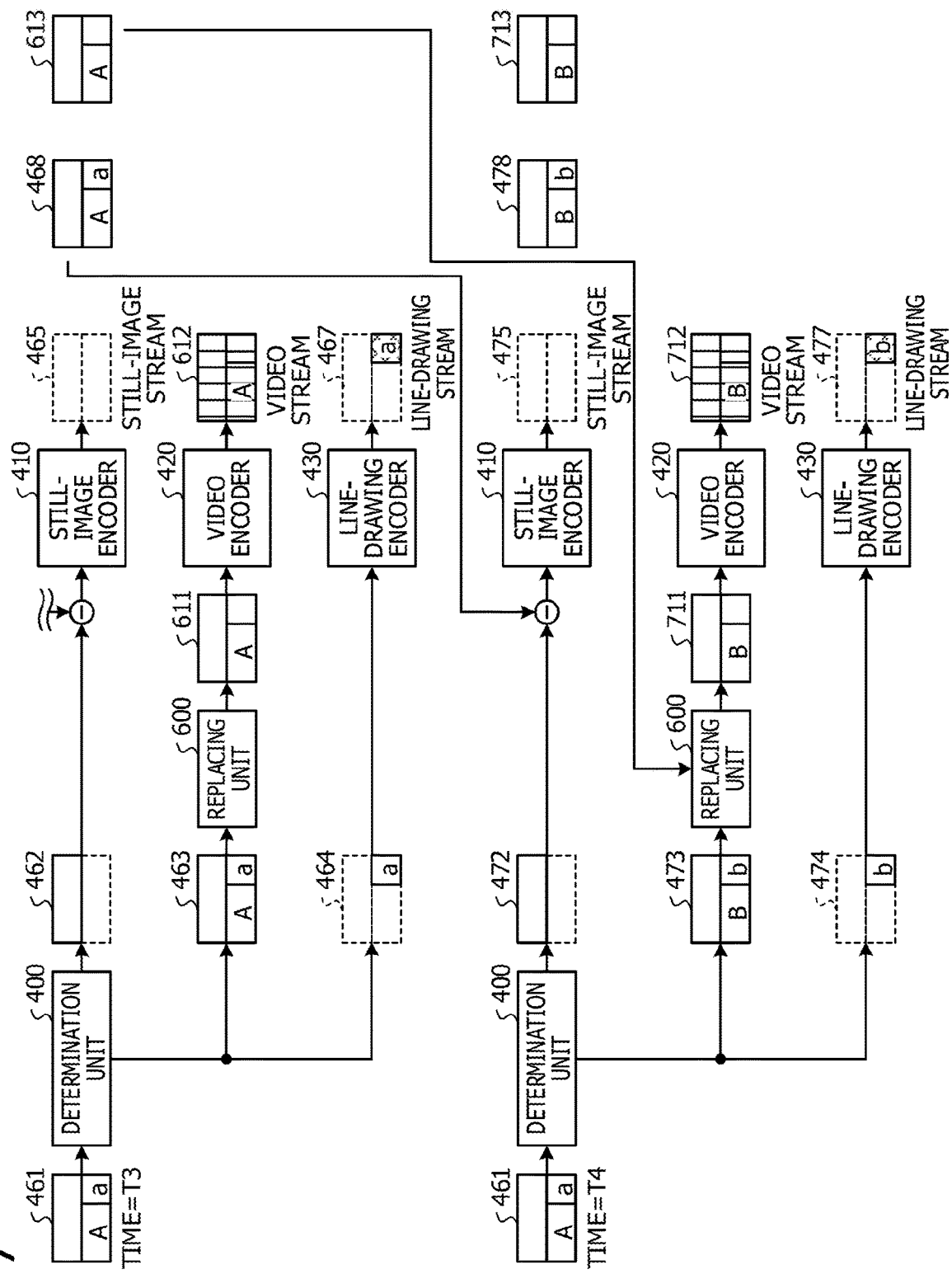
FIG. 7 is a second diagram illustrating the outline of the encoding processing by the virtual desktop server.

The encoding processing by the virtual desktop server 110 will be described. FIGS. 6 and 7 are first and second diagrams respectively illustrating the outline of the encoding processing by the virtual desktop server.

The screen image is "input" in the examples of FIGS. 6 and 7. The examples of FIGS. 6 and 7 indicate that frame images 441, 451, 461 and 471 are generated by the application 340 at respective times and input to the encoding unit. Since FIGS. 6 and 7 illustrate the continuous encoding processing, FIG. 7 redundantly illustrates the encoding processing at the time T3 in FIG. 6.

Further, the details of the encoding processing for the frame images input at the times T1 and T2 in the encoding processing illustrated in FIG. 6 are the same as the details of the encoding processing for the frame images input at the times T1 and T2 in the encoding processing illustrated in FIG. 4. Therefore, the descriptions for the same details are omitted, and the encoding processing after the time T3 will be described below.

Provided that the encoding unit 342 of the virtual desktop server 110 holds the decoded image 443 acquired by decoding the frame image 441 subjected to the encoding processing in the buffer, and also holds the frame image immediately before being input to the video encoder 420 in the other buffer. In a case of FIG. 6, since the frame images 441 and 451 input at the times T1 and T2 are not input to the video encoder 420, the frame images 441 and 451 are held as a frame image 601.

When the frame image 461 is input at the time T3, the determination unit 400 determines that the frame image 461 includes the still-image region. Consequently, a still-image difference image acquired from difference between an image 462 in the still-image region and an image at a position corresponding to a position of the still-image region of the decoded image 443 held in the buffer, is input to the still-image encoder 410.

Since the image in the still-image region is not changed, the still-image difference image has the information volume of zero, thus the still-image encoder 410 outputs NULL data as a still-image stream 465.

Further, when the frame image 461 is input at the time T3, the determination unit 400 determines whether there is the video region or not and whether there is the line-drawing region or not. When it is determined that the video region and the line-drawing region are both included in the frame image 461, a replacing unit 600 replaces the image in the line-drawing region of the frame image 463 (that is, the frame image 461) with an image at a position corresponding to a frame image 601 held in the buffer. Accordingly, the replacing unit 600 generates a post-replacing frame image 611. Further, the video encoder 420 performs the video encoding on the entire frame image 611 to generate a video stream 612.

The post-replacing frame image 611 generated by the replacing unit 600 includes the video region and the still-image region, but no line-drawing region. Consequently, the video encoder 420 does not perform the video encoding on the image in the line-drawing region. The image in the still-image region of the post-replacing frame image 611 does not change from the image in the still-image region in the immediately preceding frame image 451. Consequently, even when the video encoder 420 performs the video encoding on the image in the still-image region of the post-replacing frame image 611, the information volume does not increase.

Accordingly, the information volume of the video stream 612 generated by performing the video encoding on the post-replacing frame image 611 with the video encoder 420 is the same as the information volume of the video stream in which only the image in the video region is encoded.

Further, the decoded image 468 acquired by decoding the frame image 461 subjected to the encoding processing is held in the buffer. The frame image 611 immediately before being input to the video encoder 420 is held in the other buffer as a frame image 613.

As illustrated in FIG. 7, when the frame image 471 is input at the time T4, the determination unit 400 determines that the frame image 471 includes the still-image region. Consequently, the still-image difference image acquired from difference between the image 472 in the still-image region and an image at a position corresponding to a position of the still-image region of the decoded image 468 held in the buffer, is input to the still-image encoder 410.

Since the still-image region is not changed, the still-image difference image has the information volume of zero, thus the still-image encoder 410 outputs NULL data as a still-image stream 475.

Further, when the frame image 471 is input at the time T4, the determination unit 400 determines whether there is the video region or not and whether there is the line-drawing region or not. When it is determined that the video region and the line-drawing region are both included in the frame image 471, a replacing unit 600 replaces the image in the line-drawing region of the frame image 473 (that is, the frame image 471) with an image at a position corresponding to a frame image 613 held in the buffer. Accordingly, the replacing unit 600 generates a post-replacing frame image 711. Further, the video encoder 420 performs the video encoding on the entire frame image 711 to generate a video stream 712.

The post-replacing frame image 711 generated by the replacing unit 600 includes the video region and the still-image region, but no line-drawing region. Consequently, the video encoder 420 does not perform the video encoding on the image in the line-drawing region. The image in the still-image region of the post-replacing frame image 711 does not change from the image in the still-image region in the immediately preceding frame image 461. Consequently, even when the video encoder 420 performs the video encoding on the image in the still-image region of the post-replacing frame image 711, the information volume does not increase.

Accordingly, the information volume of the video stream 712 generated by performing the video encoding on the post-replacing frame image 711 with the video encoder 420 is the same as the information volume of the video stream in which only the image in the video region is encoded.

Further, the decoded image 478 acquired by decoding the frame image 471 subjected to the encoding processing is held in the buffer. The frame image 711 immediately before being input to the video encoder 420 is held in the other buffer as a frame image 713.

Figure 8:
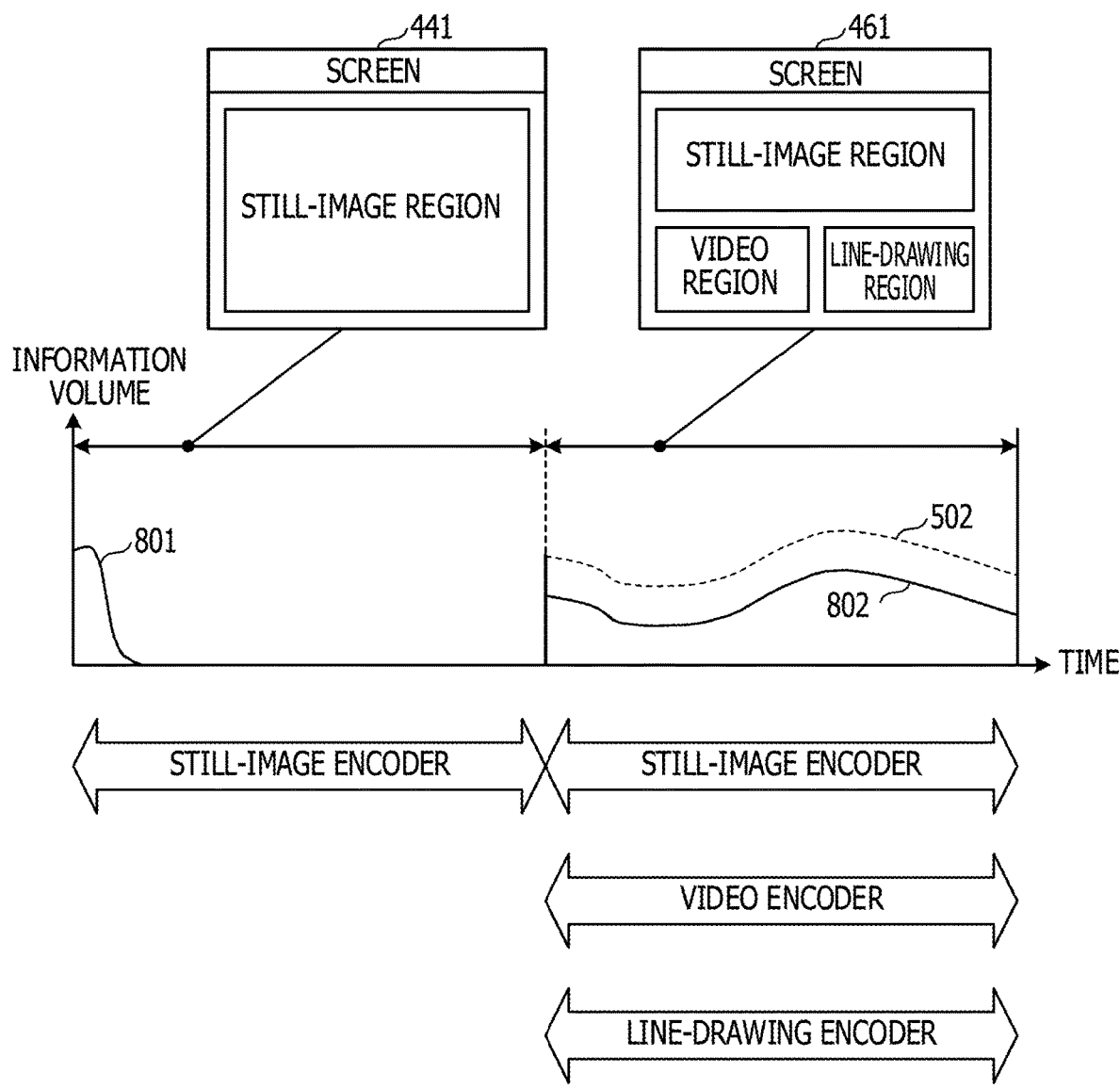
FIG. 8 is a diagram illustrating information volume of an encoded stream generated in the encoding processing by the virtual desktop server.

FIG. 8 is a diagram illustrating the information volume of the encoded stream generated in the encoding processing by the virtual desktop server. A horizontal axis is the time, and a vertical axis is the information volume, similar to FIG. 5.

As illustrated in FIG. 8, in a case of the virtual desktop server 110, the still-image encoder 410 performs the still-image encoding on the still-image region to generate the still-image stream 442 immediately after the frame image 441 of the screen image is generated, whereby the information volume is increased (see reference number 801).

On the other hand, in the virtual desktop server 110, the still-image encoder 410 subsequently encodes the difference between the decoded image held in the buffer and the image in the still-image region. Therefore, when the frame image in which the entire frame image is the still-image region continues, the still-image stream has the information volume of zero.

When a predetermined time has elapsed and the frame image 461 is generated, the information volume increases again (see reference number 802). It is because the video encoder 420 generates the video stream by encoding the entire frame image 461, and the line-drawing encoder generates the line-drawing stream by encoding the line-drawing region. Also at this time, since the image in the still-image region is not changed, the still-image stream has the information volume of zero.

Further, even after the frame image 461 is generated, the image in the video region and the image in the line-drawing region change with time. Therefore, the video stream generated by performing the video encoding on the entire frame image with the video encoder 420 has a certain extent of information volume. Similarly, the line-drawing stream generated by performing the line-drawing encoding on the image in the line-drawing region with the line-drawing encoder 430 has a certain extent of information volume. Provided that, in a case of the virtual desktop server 110, the video encoder 420 does not perform the video encoding on the image in the line-drawing region upon performing the video encoding on the entire frame image, as described above. In other words, the video encoder 420 and the line-drawing encoder 430 do not encode the same image in the line-drawing region. Since the image in the line-drawing region is replaced with the image in the still-image region before the line-drawing region is generated, the information volume does not increase even when the video encoder 420 performs the video encoding.

Accordingly, the information volume after the frame image 461 is generated is suppressed compared with the example of FIG. 5 (see reference numbers 502 and 802).

Figure 9A:
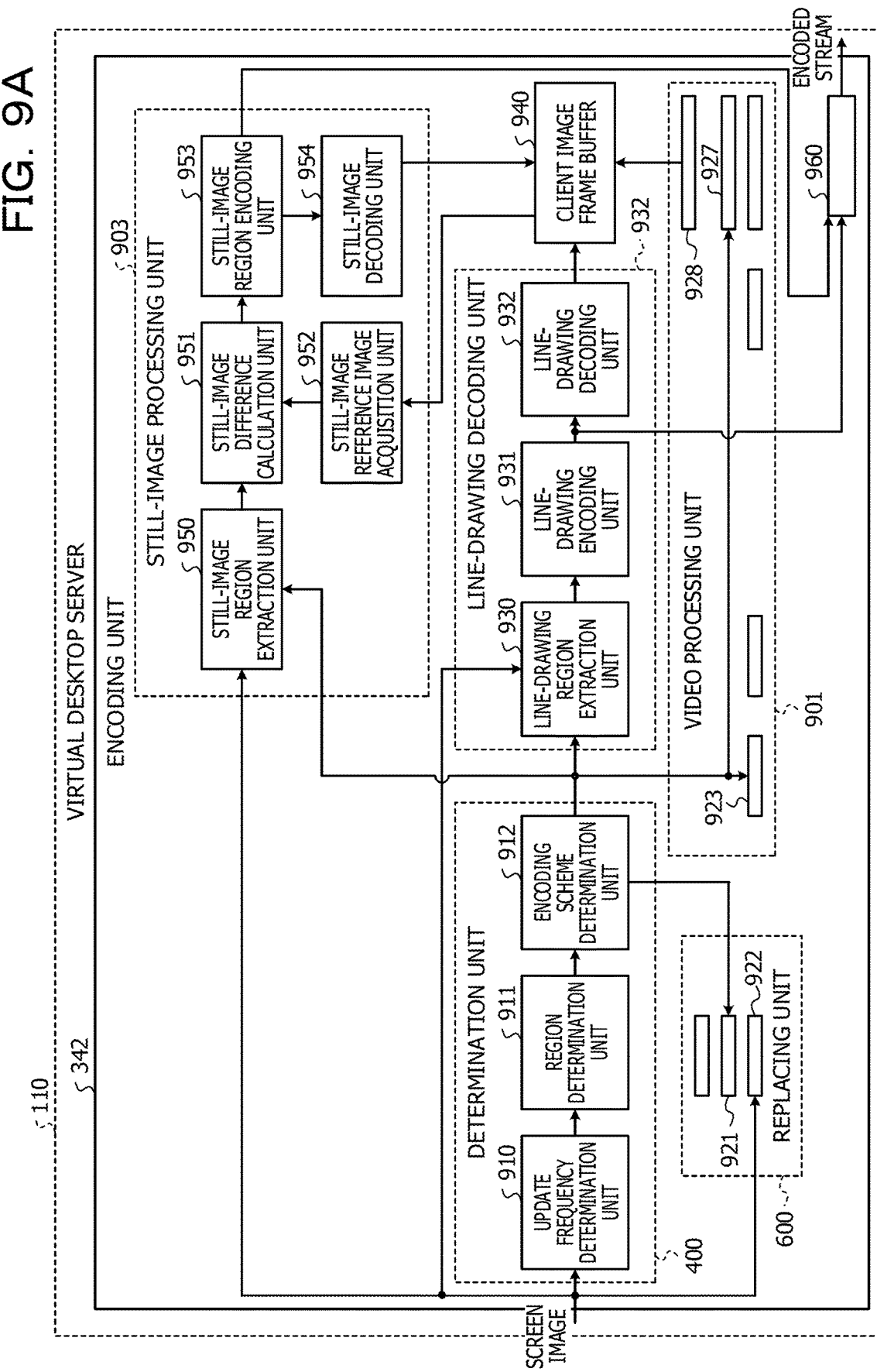
FIGS. 9A and 9B are diagrams illustrating one example of a function configuration of an encoding unit of the virtual desktop server.
Figure 9B:
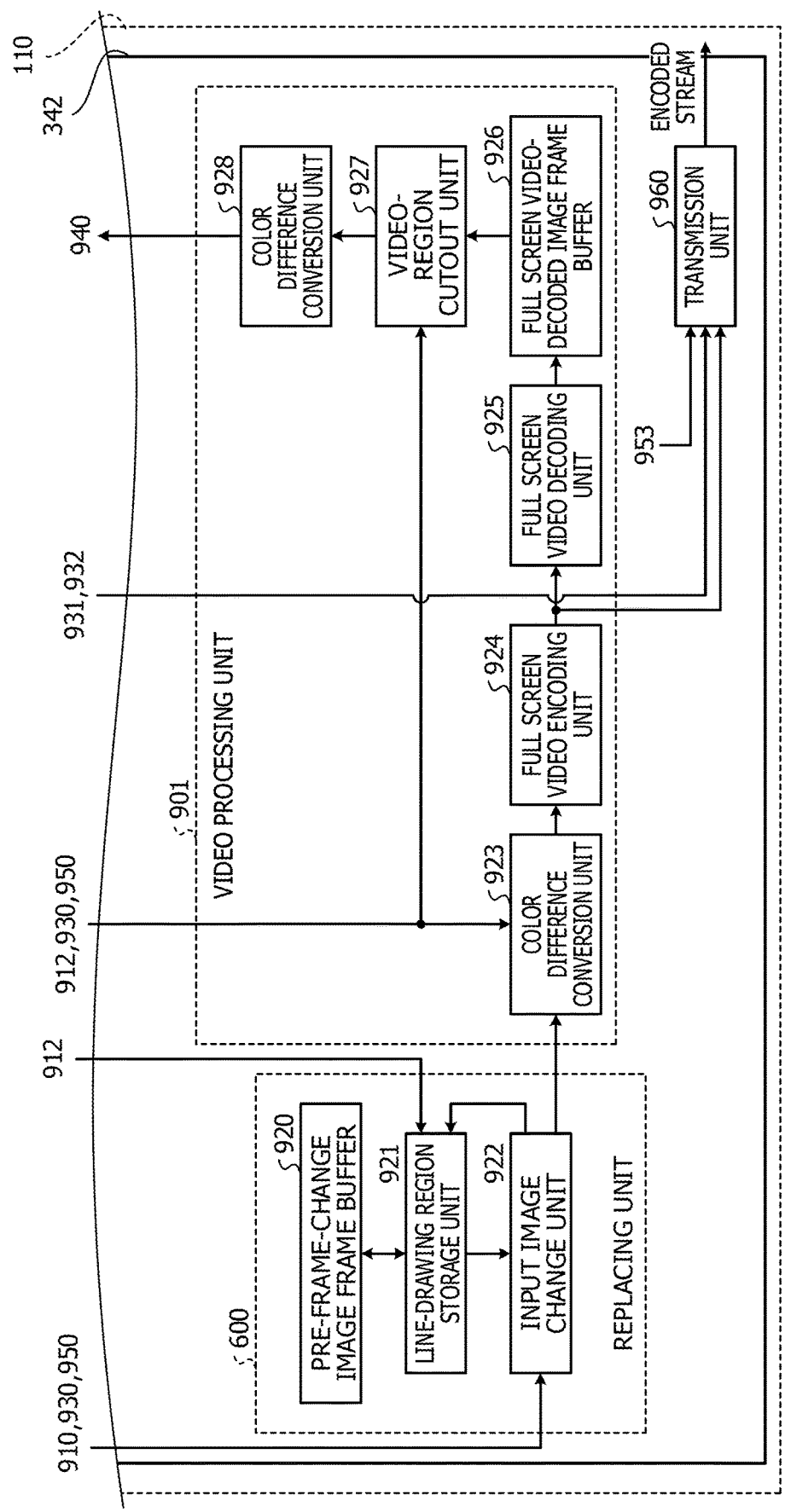

A functional configuration of the encoding unit 342 for implementing the encoding processing described above will be described below. FIGS. 9A and 9B are diagrams illustrating one example of the function configuration of the encoding unit of the virtual desktop server, which is implemented by executing an encoding program included in the application 340.

As illustrated in FIGS. 9A and 9B, the encoding unit 342 includes an update frequency determination unit 910, a region determination unit 911, and an encoding scheme determination unit 912, which constitute the determination unit 400.

The update frequency determination unit 910 acquires the screen image for each frame, and divides the acquired frame image into regions of a predetermined size (for example, 16 pixels×16 pixels). Further, the update frequency determination unit 910 calculates an update frequency for each of the divided regions, and determines that the divided region is the video region when the calculated update frequency is equal to or more than a predetermined threshold, but is the still-image region when the calculated update frequency is less than the predetermined threshold.

The region determination unit 911 calculates the number of colors included in each of the divided regions, and determines that the divided region is the line-drawing region when the calculated number of colors is less than a predetermined threshold, but is not the line-drawing region when the calculated number of colors is equal to or more than the predetermined threshold. Consequently, the region determination unit 911 is capable of determining whether each of divided regions is one of the followings:—the divided region is the still-image region and the line-drawing region;—the divided region is the still-image region but not the line-drawing region;—the divided region is the video region and the line-drawing region; and—the divided region is the video region but not the line-drawing region.

The encoding scheme determination unit 912 determines an encoding scheme based on the determination result in the region determination unit 911. In the first embodiment, the encoding scheme determination unit 912 determines that the entire frame image shall be encoded by the video encoder 420 when the video region is included in the frame image. In this case, the encoding scheme determination unit 912 notifies a color difference conversion unit 923 and a video-region cutout unit 927 of video region information.

In the first embodiment, the encoding scheme determination unit 912 determines that, when the line-drawing region is included in the frame image, the line-drawing region shall be encoded by the line-drawing encoder 430 and notifies a line-drawing region extraction unit 930 of line-drawing region information.

Further, in the first embodiment, the encoding scheme determination unit 912 determines that, when the still-image region is included in the frame image, the still-image region shall be encoded by the still-image encoder 410 and notifies a still-image region extraction unit 950 of still-image region information.

The encoding scheme determination unit 912 further determines whether or not both the video region and the line-drawing region are included in the frame image, and notifies a line-drawing region storage unit 921 of the determination result.

As illustrated in FIGS. 9A and 9B, the encoding unit 342 includes a pre-frame-change image frame buffer 920, the line-drawing region storage unit 921, and an input image change unit 922, which constitute the replacing unit 600.

The pre-frame-change image frame buffer 920 holds a frame image before being input to the video encoder 420 by a full screen video encoding unit 924. Specifically, the pre-frame-change image frame buffer 920 holds the frame image notified to the color difference conversion unit 923 by the input image change unit 922.

The line-drawing region storage unit 921 refers to the frame image held in the pre-frame-change image frame buffer 920 when the encoding scheme determination unit 912 notifies of the determination result that both the video region and the line-drawing region are included in the input frame image.

Further, the line-drawing region storage unit 921 extracts an image at a position corresponding to the line-drawing region in the input frame image from the frame image held in the pre-frame-change image frame buffer 920, and notifies the input image change unit 922 of the extracted image. Accordingly, the input image change unit 922 replaces the image in the line-drawing region of the input frame image, with the image notified by the line-drawing region storage unit 921, and notifies the color difference conversion unit 923 of the post-replacing frame image.

Further, the line-drawing region storage unit 921 writes the post-replacing frame image, notified to the color difference conversion unit 923 by the input image change unit 922, in the pre-frame-change image frame buffer 920. Accordingly, the post-replacing frame image is held in the pre-frame-change image frame buffer 920.

Meanwhile, when the encoding scheme determination unit 912 notifies of the determination result that the video region or the line-drawing region is not included in the frame image (the determination result that the video region is not included or the line-drawing region is not included), the frame image is notified to the input image change unit 922. In this case, the input image change unit 922 notifies the color difference conversion unit 923 of the input frame image without any change.

Further, the line-drawing region storage unit 921 writes the input frame image, notified to the color difference conversion unit 923 by the input image change unit 922, in the pre-frame-change image frame buffer 920. Accordingly, the input frame image is held in the pre-frame-change image frame buffer 920.

As illustrated in FIGS. 9A and 9B, the encoding unit 342 includes the color difference conversion unit 923, the full screen video encoding unit 924, a full screen video decoding unit 925, a full screen video-decoded image frame buffer 926, a video-region cutout unit 927, and a color difference conversion unit 928, which constitute a video processing unit 901.

The color difference conversion unit 923 operates when the video region information is notified by the encoding scheme determination unit 912. Specifically, the color difference conversion unit 923 converts color difference format of the frame image (the input frame image or the post-replacing frame image) notified by the input image change unit 922. Specifically, the color difference conversion unit 923 converts the color difference format from 4:4:4 format to 4:2:0 format.

Further, conversion from the 4:4:4 format to the 4:2:0 format means that a Y component is left without any change, a U component is thinned so as to be ½ times each in vertical and horizontal directions, and a V component is thinned so as to be ½ times each in the vertical and horizontal directions in the frame image.

The full screen video encoding unit 924 allows the video encoder 420 to perform the video encoding on the entire frame image for the frame image converted by the color difference conversion unit 923 to the 4:2:0 format, thereby generating a video stream.

The video encoder 420 generates the video stream with the encoding scheme conforming to video encoding standards, for example, H. 264, H. 265/HEVC, and so on. Provided that the encoding scheme used by the video encoder 420 to generate the video stream is not limited to H. 264 and H. 265/HEVC.

The full screen video encoding unit 924 notifies the full screen video decoding unit 925 and a transmission unit 960 of the video stream generated by the video encoder 420.

The full screen video decoding unit 925 generates a full screen video-decoded image by decoding the video stream notified by the full screen video encoding unit 924. Further, the full screen video decoding unit 925 notifies the full screen video-decoded image frame buffer 926 of the generated full screen video-decoded image.

The full screen video-decoded image frame buffer 926 holds the full screen video-decoded image notified by the full screen video decoding unit 925.

The video-region cutout unit 927 reads the full screen video-decoded image held in the full screen video-decoded image frame buffer 926 when the video region information is notified by the encoding scheme determination unit 912, and cuts out an image at a position of the video region. The video-region cutout unit 927 notifies the color difference conversion unit 928 of the cut-out image at the position of the video region.

The color difference conversion unit 928 converts a color difference format of the image at the position of the video region, which is notified by the video-region cutout unit 927.

Specifically, the color difference conversion unit 928 converts the color difference format from the 4:2:0 format to the 4:4:4 format.

Further, conversion from the 4:2:0 format to the 4:4:4 format means that a Y component is left without any change, a U component is thinned and interpolated so as to be two times each in vertical and horizontal directions, and a V component is thinned and interpolated so as to be two times each in the vertical and horizontal directions in the image at the position of the video region.

The color difference conversion unit 928 notifies a client image frame buffer 940 of the image (video-decoded image) at the position of the video region acquired by converting the color difference format.

Further, as illustrated in FIGS. 9A and 9B, the encoding unit 342 includes the line-drawing region extraction unit 930, a line-drawing encoding unit 931, and a line-drawing decoding unit 932, which constitute a line-drawing processing unit 902.

The line-drawing region extraction unit 930 operates when the line-drawing region information is notified by the encoding scheme determination unit 912, and extracts an image in the line-drawing region specified by the line-drawing region information from the input frame image.

The line-drawing encoding unit 931 allows the line-drawing encoder 430 to encode the image in the line-drawing region extracted by the line-drawing region extraction unit 930, thereby generating a line-drawing stream.

The line-drawing encoder 430 generates the line-drawing stream with the encoding scheme, for example, chain encoding, directed delta encoding, sketch based coding (SBC), and so on. Provided that the encoding scheme used by the line-drawing encoder 430 to generate the line-drawing stream is not limited to chain encoding, directed delta encoding, and SBC.

The line-drawing encoding unit 931 notifies the line-drawing decoding unit 932 and the transmission unit 960 of the generated line-drawing stream.

The line-drawing decoding unit 932 generates a line-drawing-decoded image by decoding the line-drawing stream notified by the line-drawing encoding unit 931. Further, the line-drawing decoding unit 932 notifies the client image frame buffer 940 of the generated line-drawing-decoded image.

The client image frame buffer 940 holds the video-decoded image notified by the color difference conversion unit 928. The client image frame buffer 940 also holds the line-drawing-decoded image notified by the line-drawing decoding unit 932. The client image frame buffer 940 further holds a still-image-decoded image notified by a still-image decoding unit 954, which will be described later.

Further, as illustrated in FIGS. 9A and 9B, the encoding unit 342 includes the still-image region extraction unit 950, a still-image difference calculation unit 951, a still-image reference image acquisition unit 952, a still-image region encoding unit 953, and the still-image decoding unit 954, which constitute a still-image processing unit 903.

The still-image region extraction unit 950 operates when the still-image region information is notified by the encoding scheme determination unit 912. Specifically, the still-image region extraction unit 950 extracts an image in the still-image region specified by the still-image region information from the input frame image. Further, the still-image region extraction unit 950 notifies the still-image difference calculation unit 951 of the extracted image in the still-image region.

The still-image difference calculation unit 951 generates a difference image for the image in the still-image region. Specifically, a still-image difference image is generated based on a difference between:—the still-image-decoded image of an immediately preceding frame image, which is stored in the client image frame buffer 940 and read by the still-image reference image acquisition unit 952; and—the image in the still-image region of the frame image to be processed, notified by the still-image region extraction unit 950. Further, the still-image difference calculation unit 951 notifies the still-image region encoding unit 953 of the generated the still-image difference image.

The still-image region encoding unit 953 generates a still-image stream using the still-image encoder 410 from the still-image difference image notified by the still-image difference calculation unit 951.

The still-image encoder 410 generates the still-image stream with the encoding scheme, for example, joint photographic experts group (JPEG) and so on. Provided that the encoding scheme used by the still-image encoder 410 to generate the still-image stream is not limited to JPEG.

The still-image region encoding unit 953 notifies the still-image decoding unit 954 and the transmission unit 960 of the generated still-image stream.

The still-image decoding unit 954 generates a still-image-decoded image by decoding the still-image stream notified by the still-image region encoding unit 953. Further, the still-image decoding unit 954 notifies the client image frame buffer 940 of the generated still-image-decoded image.

The transmission unit 960 transmits to the user terminal 120 the video stream notified by the full screen video encoding unit 924, the line-drawing stream notified by the line-drawing encoding unit 931, and the still-image stream notified by the still-image region encoding unit 953.

Figure 10:
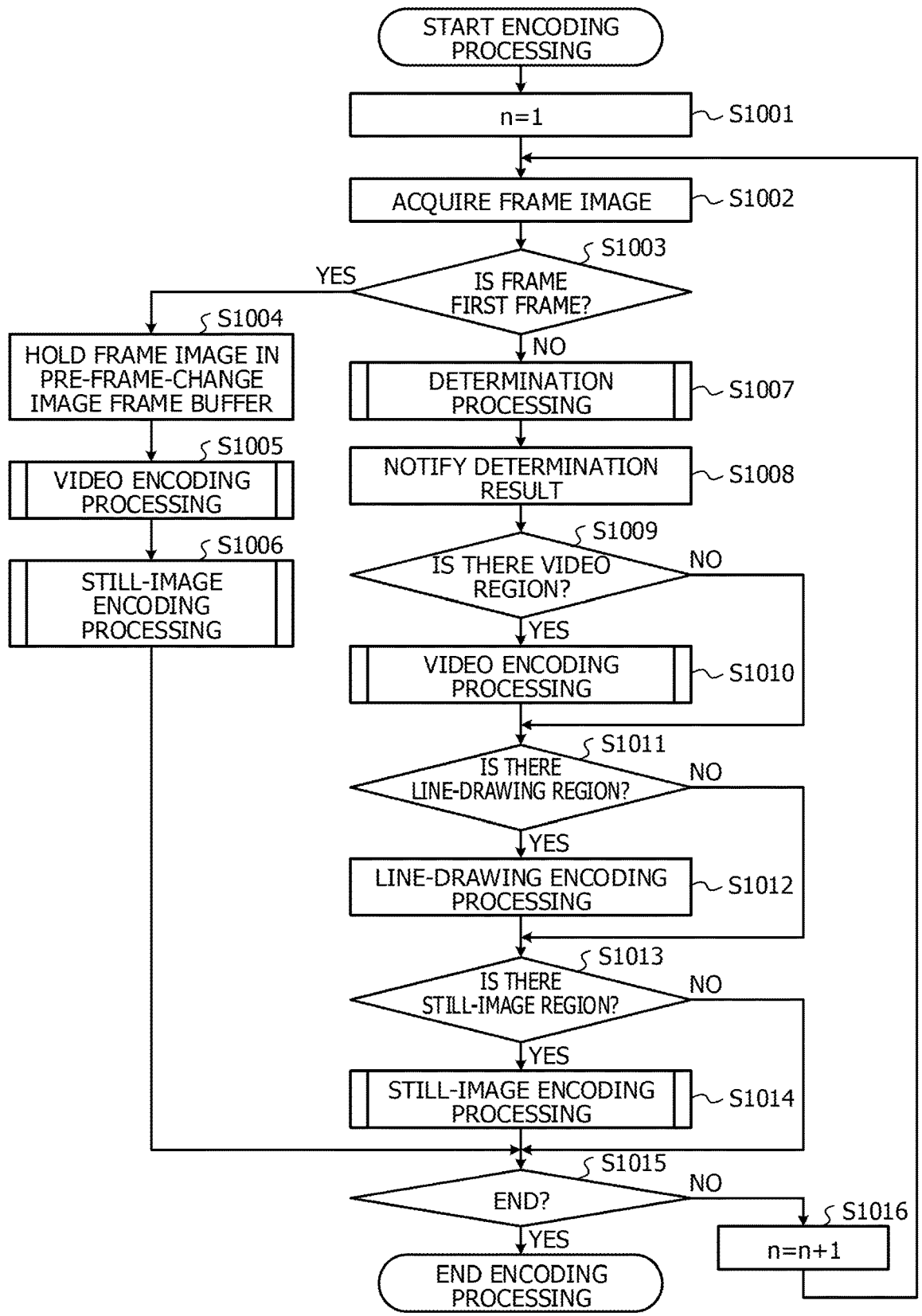
FIG. 10 is a flowchart illustrating a flow of the encoding processing by the virtual desktop server.

A flow of the encoding processing by the virtual desktop server 110 will be described. FIG. 10 is a flowchart illustrating the flow of the encoding processing by the virtual desktop server.

When the application 340 is activated, the encoding unit 342 starts the encoding processing illustrated in FIG. 10.

In step S1001, the determination unit 400 inputs "1" to a frame counter n.

In step S1002, the determination unit 400 acquires a frame image of an n-th frame of the screen image.

In step S1003, the determination unit 400 determines whether the n-th frame is a first frame (n=1) or not. When it is determined in step S1003 that the frame is the first frame (YES in step S1003), the processing proceeds to step S1004.

In step S1004, the input image change unit 922 acquires the frame image, and the line-drawing region storage unit 921 writes acquired input frame image in the pre-frame-change image frame buffer 920. Accordingly, the frame image of the first frame is held in the pre-frame-change image frame buffer 920.

In step S1005, the video processing unit 901 executes the video encoding processing. Further, in step S1006, the still-image processing unit 903 executes the still-image encoding processing. Accordingly, the client image frame buffer 940 holds a decoded image acquired by executing the encoding processing on the frame image of the first frame and decoding the encoded image. The transmission unit 960 transmits a video-encoded stream and a still-image-encoded stream, acquired by executing the encoding processing on the frame image of the first frame.

Meanwhile, when it is determined in step S1003 that the frame is not the first frame (n≠1) (NO in step S1003), the processing proceeds to step S1007. In step S1007, the update frequency determination unit 910 and the region determination unit 911, of the determination unit 400, execute the determination processing.

In step S1008, the encoding scheme determination unit 912 of the determination unit 400 determines whether or not both the video region and the line-drawing region are included in the frame image of the n-th frame, and notifies the line-drawing region storage unit 921 of the replacing unit 600 of the determination result.

In step S1009, the encoding scheme determination unit 912 of the determination unit 400 determines whether or not the video region is included in the frame image of the n-th frame. In step S1009, when it is determined that the video region is included (YES in step S1009), the video region information is notified to the color difference conversion unit 923 and the video-region cutout unit 927, and the processing proceeds to step S1010.

In step S1010, the video processing unit 901 performs the video encoding processing on the frame image of the n-th frame, and the processing proceeds to step S1011. Meanwhile, when it is determined in step S1009 that the video region is not included (NO in step S1009), the processing directly proceeds to step S1011.

In step S1011, the encoding scheme determination unit 912 of the determination unit 400 determines whether or not the line-drawing region is included in the frame image of the n-th frame. In step S1011, when it is determined that the line-drawing region is included (YES in step S1011), the line-drawing region information is notified to the line-drawing region extraction unit 930, and the processing proceeds to step S1012.

In step S1012, the line-drawing processing unit 902 executes the line-drawing encoding processing, and the processing proceeds to step S1013. Meanwhile, when it is determined in step S1011 that the line-drawing region is not included (NO in step S1011), the processing directly proceeds to step S1013.

In step S1013, the determination unit 400 determines whether or not the still-image region is included in the frame image of the n-th frame. In step S1013, when it is determined that the still-image region is included (YES in step S1013), the still-image region information is notified to the still-image region extraction unit 950, and the processing proceeds to step S1014.

In step S1014, the still-image processing unit 903 executes the still-image encoding processing, and the processing proceeds to step S1015. Meanwhile, when it is determined in step S1013 that the still-image region is not included (NO in step S1013), the processing directly proceeds to step S1015.

In step S1015, the determination unit 400 determines whether the encoding processing shall be ended or not. When it is determined in step S1015 that the encoding processing shall not be ended (NO in step S1015), the processing proceeds to step S1016. The frame counter n is incremented, and the processing returns to step S1002.

Meanwhile, when it is determined in step S1015 that the encoding processing shall be ended (YES in step S1015), the encoding processing is ended.

Each step (steps S1005, S1006, S1007, S1010 and S1014) in the encoding processing illustrated in FIG. 10 will be described below.

Figure 11A:
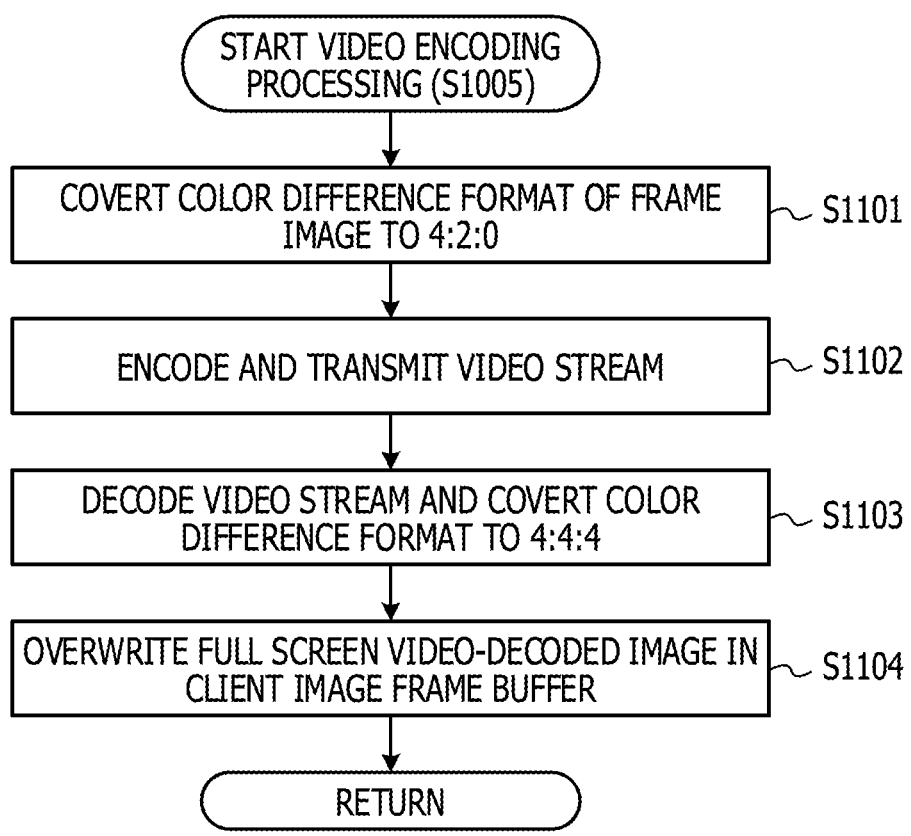
FIG. 11A is a first flowchart illustrating the details of each step in the encoding processing.

At first, the details of step S1005 (video encoding processing) and step S1006 (still-image encoding processing) will be described. FIG. 11A is a first flowchart illustrating the details of each step in the encoding processing, which indicates the details of step S1005 (video encoding processing). As illustrated in FIG. 11A, in step S1101, the color difference conversion unit 923 converts the color difference format of the frame image of the first frame, acquired by the input image change unit 922, to the 4:2:0 format.

In step S1102, the full screen video encoding unit 924 allows the video encoder 420 to encode on the frame image of the first frame image with the converted color difference format, thereby generating a video stream. Further, the transmission unit 960 transmits the generated video stream.

In step S1103, the full screen video decoding unit 925 generates a full screen video-decoded image by decoding the video stream. Further, the color difference conversion unit 928 converts the color difference format of the generated full screen video-decoded image to the 4:4:4 format.

In step S1104, the color difference conversion unit 928 writes the full screen video-decoded image with the converted color difference format in the client image frame buffer 940.

FIG. 11B is a second flowchart illustrating the details of each step in the encoding processing, which indicates the details of step S1006 (still-image encoding processing). As illustrated in FIG. 11B, in step S1111, the still-image reference image acquisition unit 952 acquires the full screen video-decoded image which is held in the client image frame buffer 940 by performing the video encoding processing on the frame image of the first frame. Further, the still-image reference image acquisition unit 952 acquires an image in the still-image region from the acquired full screen video-decoded image.

In step S1112, the still-image region extraction unit 950 extracts the image in the still-image region from the frame image of the first frame. Further, the still-image difference calculation unit 951 generates a still-image difference image from difference between the extracted image in the still-image region and the image in the still-image region of the full screen video-decoded image, acquired by the still-image reference image acquisition unit 952.

In step S1113, the still-image region encoding unit 953 performs the still-image encoding on the generated difference image using the still-image encoder 410, thereby generating a still-image stream. Further, the transmission unit 960 transmits the generated still-image stream.

In step S1114, the still-image decoding unit 954 decodes the still-image stream.

In step S1115, the still-image decoding unit 954 adds the decoded still-image stream to the image in the still-image region, acquired in step S1111, thereby generating a still-image-decoded image.

In step S1116, the still-image decoding unit 954 writes the generated still-image-decoded image in the client image frame buffer 940.

Figure 12A:
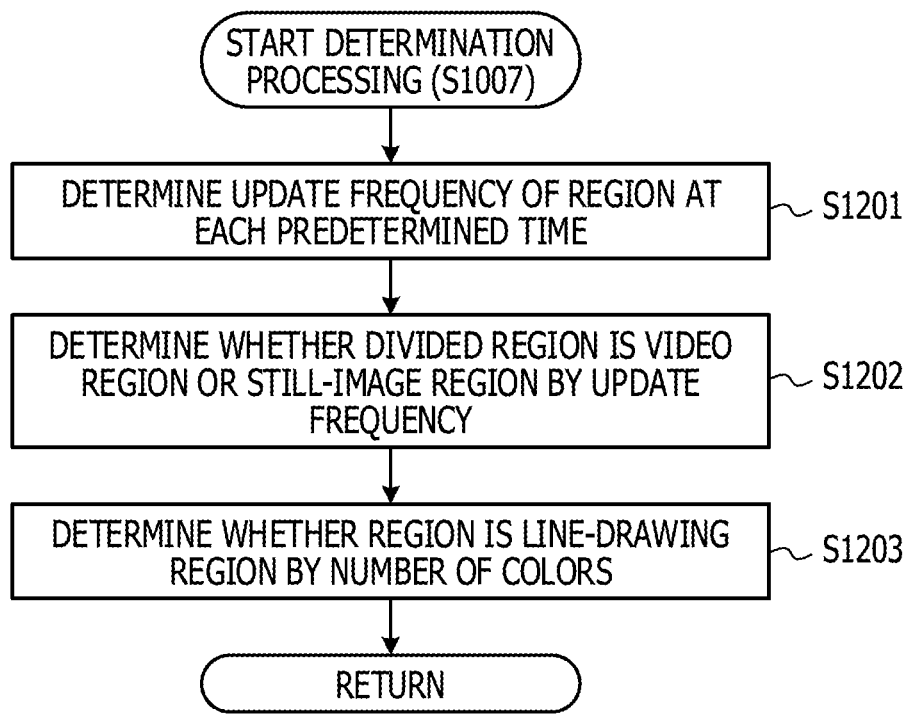
FIG. 12A is a third flowchart illustrating the details of each step in the encoding processing.

Subsequently, the details of step S1007 (determination processing) and step S1010 (video encoding processing) will be described. FIG. 12A is a third flowchart illustrating the details of each step in the encoding processing, which indicates the details of step S1007 (determination processing). As illustrated in FIG. 12A, in step S1201, the update frequency determination unit 910 divides the input frame image into a plurality of regions, and calculates update frequency of each of divided regions.

In step S1202, the region determination unit 911 determines whether each of the divided regions is the video region or the still-image region by determining whether or not the calculated update frequency is equal to or more than a predetermined threshold.

In step S1203, the region determination unit 911 calculates the number of colors included in each of the divided regions, and determines that the divided region is the line-drawing region when the calculated number of colors is less than a predetermined threshold, but is not the line-drawing region when the calculated number of colors is equal to or more than the predetermined threshold.

FIG. 12B is a fourth flowchart illustrating the details of each step in the encoding processing, which indicates the details of step S1010 (video encoding processing). As illustrated in FIG. 12B, in step S1211, the line-drawing region storage unit 921 determines whether both the video region and the line-drawing region are included or not based on the determination result notified by the encoding scheme determination unit 912.

When it is determined in step S1211 that both the video region and the line-drawing region are included (YES in step S1211), the processing proceeds to step S1212. In step S1211, the line-drawing region storage unit 921 refers to the pre-frame-change image frame buffer 920, and acquires an image in a region corresponding to a position of the line-drawing region included in a frame image of an (n−1)-th frame. Further, the line-drawing region storage unit 921 notifies the input image change unit 922 of the acquired image.

In step S1213, the input image change unit 922 acquires the frame image of the n-th frame, overwrites the image notified by line-drawing region storage unit 921 at the position of the line-drawing region, and notifies the video processing unit 901 of the overwritten frame image of the n-th frame.

Meanwhile, when it is determined in step S1211 that both the video region and the line-drawing region are not included (NO in step S1211), the processing proceeds to step S1214.

In step S1214, the input image change unit 922 notifies the color difference conversion unit 923 of the video processing unit 901 of the frame image of the n-th frame without any change.

In step S1215, the color difference conversion unit 923 converts the color difference format of the frame image of the n-th frame, notified by the input image change unit 922, to the 4:2:0 format. Further, the full screen video encoding unit 924 allows the video encoder 420 to perform the video encoding on the entire frame image for the frame image converted to the 4:2:0 format, thereby generating a video stream.

In step S1216, the transmission unit 960 transmits the generated video stream to the user terminal 120.

In step S1217, the full screen video decoding unit 925 generates a full screen video-decoded image by decoding the video stream. Further, the video-region cutout unit 907 cuts out an image at a position of the video region from the full screen video-decoded image, based on the video region information notified by the encoding scheme determination unit 912. The color difference conversion unit 928 converts the color difference format of the cut-out image at the position of the video region to the 4:4:4 format, thereby generating a video-decoded image.

In step S1218, the color difference conversion unit 928 writes the generated video-decoded image in the client image frame buffer 940.

In step S1219, the line-drawing region storage unit 921 acquires the frame image of the n-th frame, notified by the input image change unit 922 to the video processing unit 901 in step S1213 or step S1214.

In step S1220, the line-drawing region storage unit 921 writes the acquired frame image of the n-th frame in the pre-frame-change image frame buffer 920.

Figure 13:
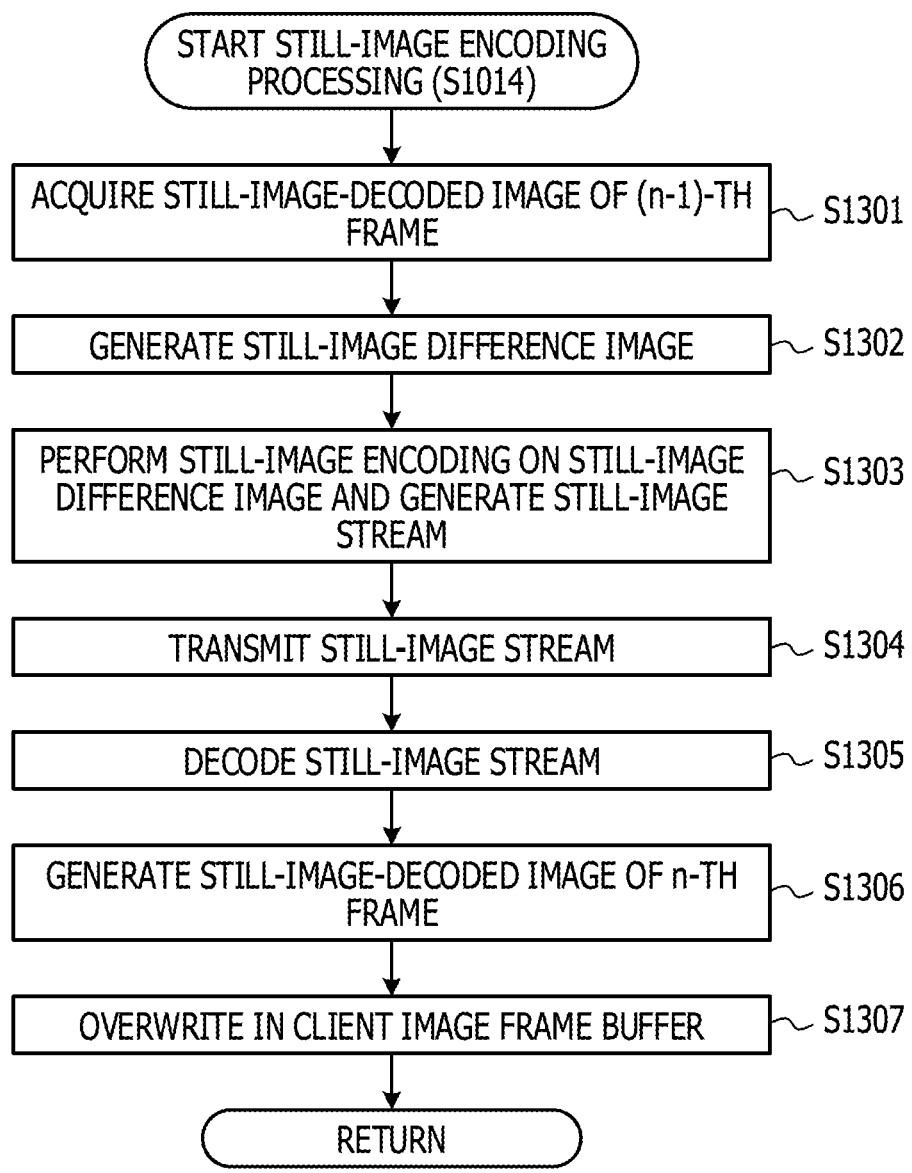
FIG. 13 is a fifth flowchart illustrating the details of each step in the encoding processing.

Subsequently, the details of step S1014 (still-image encoding processing) will be described. FIG. 13 is a fifth flowchart illustrating the details of each step in the encoding processing.

In step S1301, the still-image reference image acquisition unit 952 acquires the still-image-decoded image corresponding to the frame image of the (n−1)-th frame from the client image frame buffer 940.

In step S1302, the still-image region extraction unit 950 extracts an image in the still-image region from the frame image of the n-th frame based on the still-image region information notified by the encoding scheme determination unit 912. Further, the still-image difference calculation unit 951 generates a still-image difference image from difference between the extracted image in the still-image region from the frame image of the n-th frame and the still-image-decoded image corresponding to the frame image of the (n−1)-th frame.

In step S1303, the still-image region encoding unit 953 performs the still-image encoding on the still-image difference image using the still-image encoder 410, thereby generating a still-image stream.

In step S1304, the transmission unit 960 transmits the generated still-image stream to the user terminal 120.

In step S1305, the still-image decoding unit 954 decodes the still-image stream. In step S1306, the still-image decoding unit 954 adds the decoded still-image stream to the still-image-decoded image corresponding to the frame image of the (n−1)-th frame, thereby generating a still-image-decoded image corresponding to the frame image of the n-th frame.

In step S1307, the still-image decoding unit 954 writes the still-image-decoded image corresponding to the frame image of the n-th frame in the client image frame buffer 940.

Figure 14:
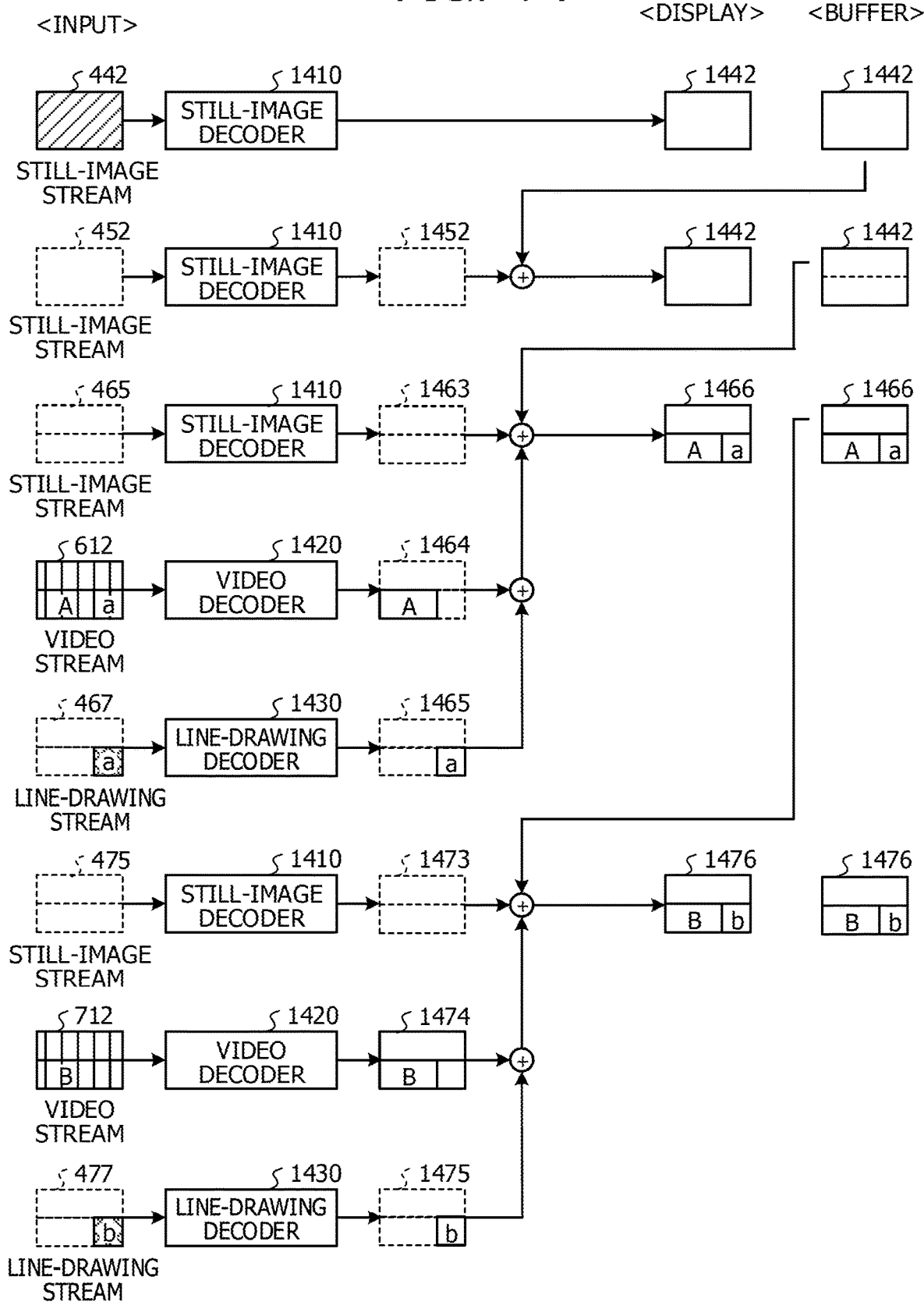
FIG. 14 is a diagram illustrating an outline of a decoding processing by the user terminal.

An outline of a decoding processing by the user terminal 120 will be described below. FIG. 14 is a diagram illustrating the outline of the decoding processing by the user terminal. In FIG. 14, encoded streams illustrated in "input" column indicate the encoded streams received at each time.

Specifically, the still-image stream 442 is a still-image stream which is generated by the virtual desktop server 110 based on the frame image 441 at the time T1 and transmitted. The still-image stream 452 is a still-image stream which is generated by the virtual desktop server 110 based on the frame image 451 at the time T2 and transmitted.

The still-image stream 465, the video stream 612, and the line-drawing stream 467 are respectively a still-image stream, a video stream, and a line-drawing stream, which are generated by the virtual desktop server 110 based on the frame image 461 at the time T3 and transmitted.

Further, the still-image stream 475, the video stream 712, and the line-drawing stream 477 are respectively a still-image stream, a video stream, and a line-drawing stream, which are generated by the virtual desktop server 110 based on the frame image 471 at the time T4 and transmitted. Therefore, the reference symbols ("A", "B", "a" and "b") indicated in FIG. 14 are the same as those in FIGS. 6 and 7.

As illustrated in FIG. 14, the decoding unit 351 receives the still-image stream 442, and a still-image decoder 1410 decodes the still-image stream 442. Thus, a still-image-decoded image 1442 is displayed on the user terminal 120. In the decoding unit 351, the still-image-decoded image 1442 is held in a buffer.

The still-image stream 452 received by the decoding unit 351 is the NULL data. Accordingly, the still-image-decoded image 1442 held in the buffer is added to a still-image-decoded image 1452 decoded by the still-image decoder 1410 to output the still-image-decoded image 1442. Thus, the still-image-decoded image 1442 is displayed on the user terminal 120. In the decoding unit 351, the still-image-decoded image 1442 is held in a buffer.

Subsequently, the decoding unit 351 receives the still-image stream 465, the video stream 612, and the line-drawing stream 467. The still-image stream 465 is decoded by the still-image decoder 1410. An image in the corresponding region of the still-image-decoded image 1442 held in the buffer is added to the decoded still-image stream, thereby generating a still-image-decoded image. Since the still-image stream 465 is the NULL data, the generated still-image-decoded image is equivalent to the image in the corresponding region of the still-image-decoded image 1442.

The video stream 612 is decoded by a video decoder 1420 to generate a video-decoded image 1464. The line-drawing stream 467 is decoded by a line-drawing decoder 1430 to generate a line-drawing-decoded image 1465. A decoded image 1466 is generated and displayed by adding the generated video-decoded image 1464 and the generated line-drawing-decoded image 1465 to the still-image-decoded image. The generated decoded image 1466 is held in the buffer.

Subsequently, the decoding unit 351 receives the still-image stream 475, the video stream 712, and the line-drawing stream 477. The still-image stream 475 is decoded by the still-image decoder 1410. An image in the corresponding region of the decoded image 1466 held in the buffer is added to the decoded still-image stream, thereby generating a still-image-decoded image. Since the still-image stream 475 is the NULL data, the generated still-image-decoded image is equivalent to the image in the corresponding region of the decoded image 1466.

The video stream 712 is decoded by a video decoder 1420 to generate a video-decoded image 1474. The line-drawing stream 477 is decoded by a line-drawing decoder 1430 to generate a line-drawing-decoded image 1475. A decoded image 1476 is generated and displayed by adding the generated video-decoded image 1474 and the generated line-drawing-decoded image 1475 to the still-image-decoded image. The generated decoded image 1476 is held in the buffer.

Figure 15:
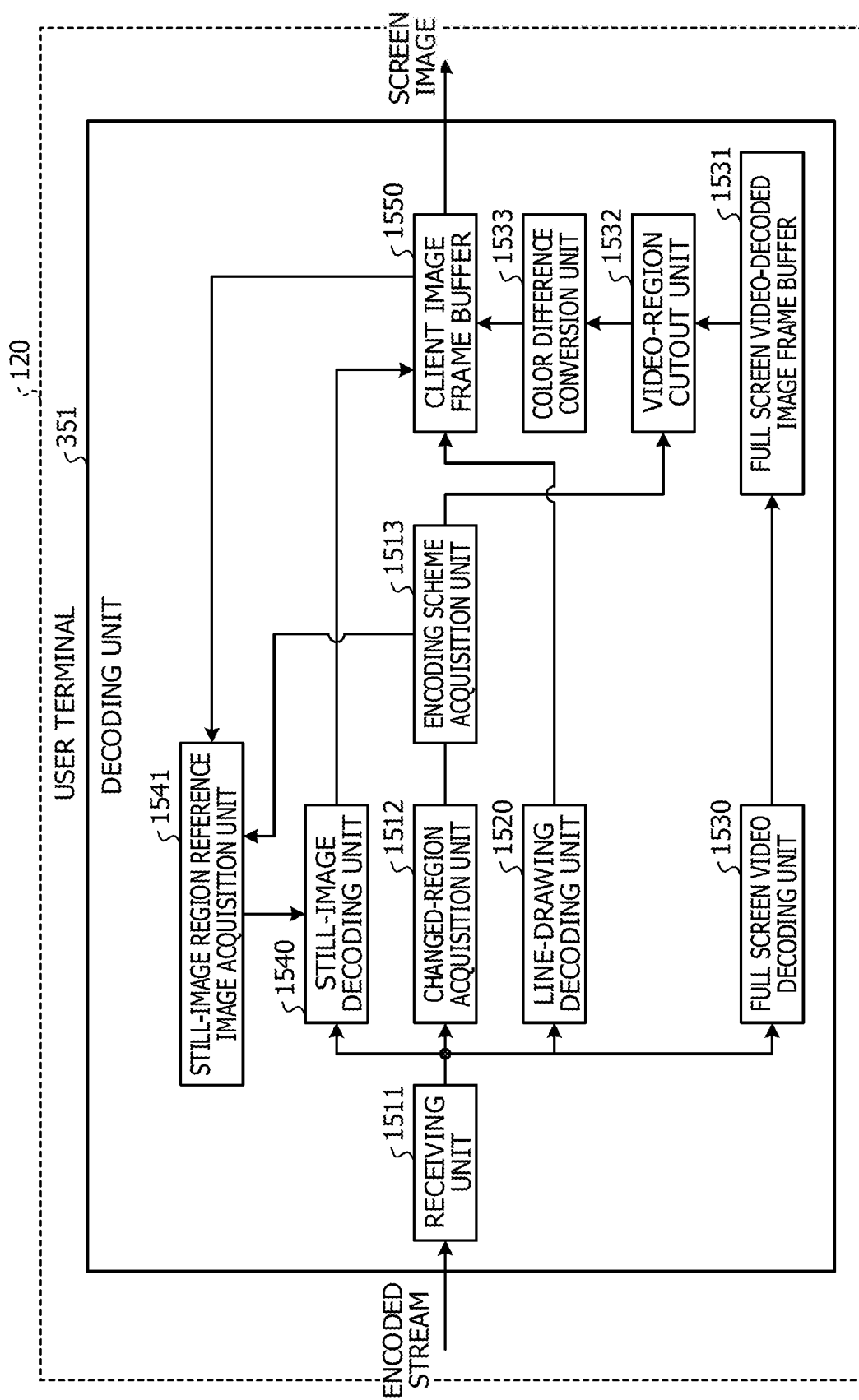
FIG. 15 is a diagram illustrating one example of a function configuration of a decoding unit of the user terminal.

A functional configuration of the decoding unit 351 for implementing the decoding processing described above will be described below. FIG. 15 is a diagram illustrating one example of a function configuration of the decoding unit of the user terminal. A receiving unit 1511 receives an encoded stream for each frame from the virtual desktop server 110, and notifies a changed-region acquisition unit 1512 of the received encoded stream.

The changed-region acquisition unit 1512 acquires the video region information and the still-image region information and notifies an encoding scheme acquisition unit 1513 of the information.

The encoding scheme acquisition unit 1513 notifies a video-region cutout unit 1532 of the video region information. Further, the encoding scheme acquisition unit 1513 notifies a still-image region reference image acquisition unit 1541 of the still-image region information.

A line-drawing decoding unit 1520 decodes the line-drawing stream using the line-drawing decoder 1430 to generate a line-drawing-decoded image, and notifies a client image frame buffer 1550 of the generated stream.

A full screen video decoding unit 1530 decodes the video stream using the video decoder 1420 to generate a full screen video-decoded image, and notifies a full screen video-decoded image frame buffer 1531 of the generated image.

The full screen video-decoded image frame buffer 1531 holds the full screen video-decoded image notified by the full screen video decoding unit 1530.

A video-region cutout unit 1532 cuts out an image at a position of the video region from the full screen video-decoded image held in the full screen video-decoded image frame buffer 1531, based on the video region information notified by the encoding scheme acquisition unit 1513. The video-region cutout unit 1532 notifies a color difference conversion unit 1533 of the cut-out image at the position of the video region.

The color difference conversion unit 1533 converts the color difference format of the image at the position of the video region, which is notified by the video-region cutout unit 1532. Specifically, the color difference conversion unit 1533 converts the color difference format from the 4:2:0 format to the 4:4:4 format.

The color difference conversion unit 1533 notifies a client image frame buffer 1550 of the image (video-decoded image) at the position of the video region acquired by converting the color difference format.

A still-image decoding unit 1540 acquires the received still-image stream. Further, the still-image decoding unit 1540 generates a still-image-decoded image, after the still-image stream is decoded using the still-image decoder 1410, by adding an image in a corresponding region of the still-image-decoded image of the immediately preceding frame, read by the still-image region reference image acquisition unit 1541, to the decoded stream. The still-image decoding unit 1540 notifies the client image frame buffer 1550 of the generated still-image-decoded image.

The client image frame buffer 1550 holds the line-drawing-decoded image notified by the line-drawing decoding unit 1520, the video-decoded image notified by the color difference conversion unit 1533, and the still-image-decoded image notified by the still-image decoding unit 1540. The line-drawing-decoded image, the video-decoded image, and the still-image-decoded image, held by the client image frame buffer 1550, are displayed on the user terminal 120.

Figure 16:
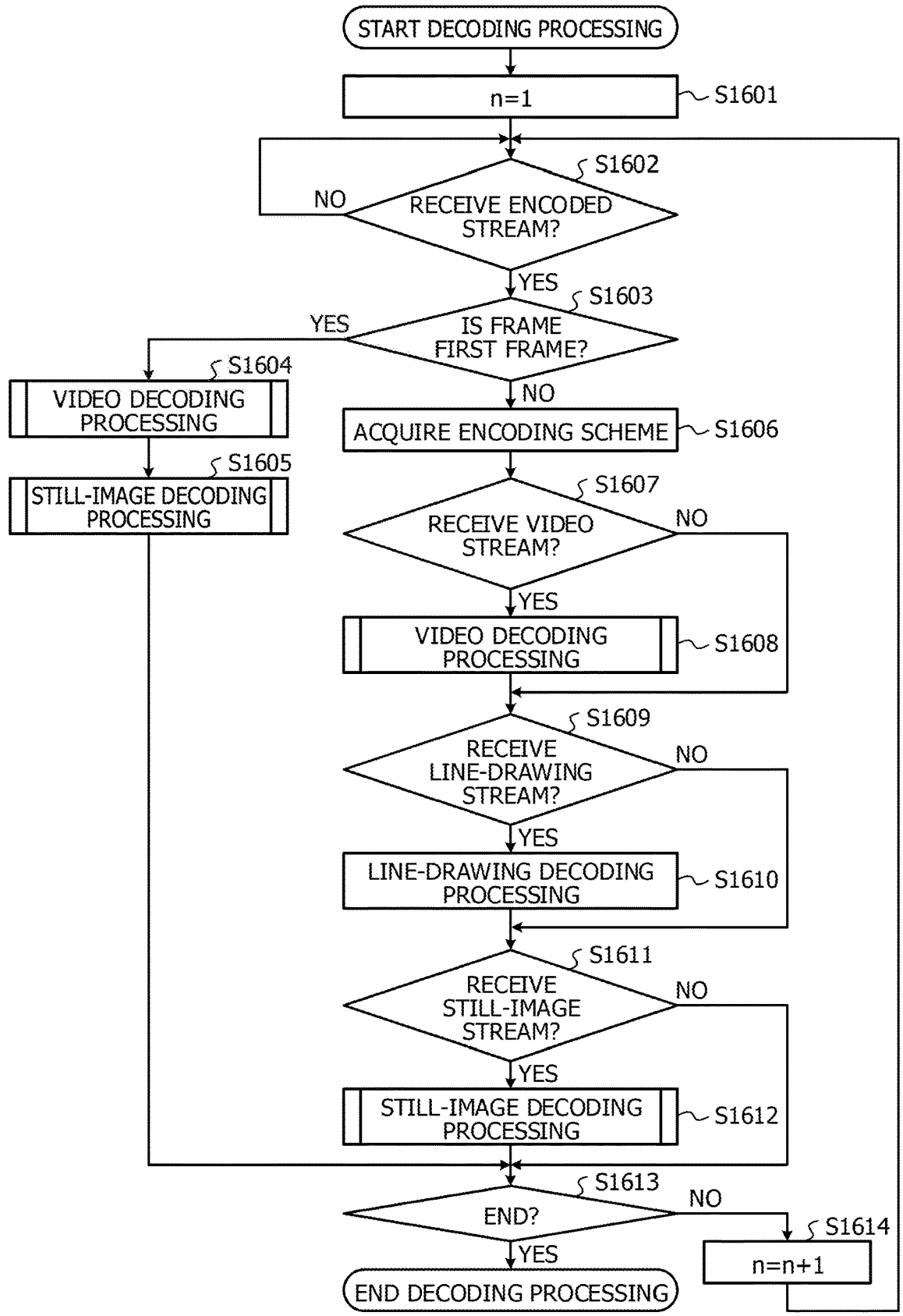
FIG. 16 is a flowchart illustrating a flow of the decoding processing by the user terminal.

A flow of the decoding processing by the user terminal 120 will be described below. FIG. 16 is a flowchart illustrating the flow of the decoding processing by the user terminal. When the application 350 is activated, the decoding unit 351 starts the decoding processing illustrated in FIG. 16.

In step S1601, the receiving unit 1511 inputs "1" to a frame counter n.

In step S1602, the receiving unit 1511 determines whether the encoded stream is received or not.

When it is determined that the encoded stream is not received in step S1602 (NO in step S1602), the processing ceases until the encoded stream is received.

Meanwhile, when it is determined in step S1602 that the encoded stream is received (YES in step S1602), the processing proceeds to step S1603.

In step S1603, the receiving unit 1511 determines whether it is a first frame (n=1) or not. When it is determined in step S1603 that it is the first frame (YES in step S1603), the processing proceeds to step S1604.

In step S1604, the full screen video decoding unit 1530 executes the video decoding processing. Further, in step S1605, the still-image decoding unit 1540 executes the still-image decoding processing. Accordingly, the client image frame buffer 1550 holds a decoded image acquired by decoding an encoded stream of the first frame, and the first frame of the screen image is displayed on the display device 225 of the user terminal 120.

Meanwhile, when it is determined in step S1603 that it is not the first frame (n≠1) (NO in step S1603), the processing proceeds to step S1606. In step S1606, the changed-region acquisition unit 1512 acquires the video region information and the still-image region information. The encoding scheme acquisition unit 1513 notifies the video-region cut-out unit 1532 of the video region information, and notifies the still-image decoding unit 1540 and the still-image region reference image acquisition unit 1541 of the still-image region information.

In step S1607, the full screen video decoding unit 1530 determines whether the video stream is received or not. When it is determined in step S1607 that the video stream is received (YES in step S1607), the processing proceeds to step S1608. After the video decoding processing is executed, the processing proceeds to step S1609.

Meanwhile, when it is determined in step S1607 that the video stream is not received (NO in step S1607), the processing directly proceeds to step S1609.

In step S1609, the line-drawing decoding unit 1520 determines whether the line-drawing stream is received or not. When it is determined in step S1609 that the line-drawing stream is received (YES in step S1609), the processing proceeds to step S1610. After the line-drawing decoding processing is executed to generate a line-drawing-decoded image, the processing proceeds to step S1611.

Meanwhile, when it is determined in step S1609 that the line-drawing stream is not received (NO in step S1609), the processing directly proceeds to step S1611.

In step S1611, the still-image decoding unit 1540 determines whether the still-image stream is received or not. When it is determined in step S1611 that the still-image stream is received (YES in step S1611), the processing proceeds to step S1612. After the still-image decoding processing is executed, the processing proceeds to step S1613.

Meanwhile, when it is determined in step S1611 that the still-image stream is not received (NO in step S1611), the processing directly proceeds to step S1613.

In step S1613, the receiving unit 1511 determines whether the decoding processing shall be ended or not. When it is determined in step S1613 that the decoding processing shall not be ended (NO in step S1613), the processing proceeds to step S1614. The frame counter n is incremented, and the processing returns to step S1602.

Meanwhile, when it is determined in step S1613 that the decoding processing shall be ended (YES in step S1613), the decoding processing is ended.

Each step (steps S1604, S1605, S1608, and S1612) in the decoding processing illustrated in FIG. 16 will be described below.

Figure 17A:
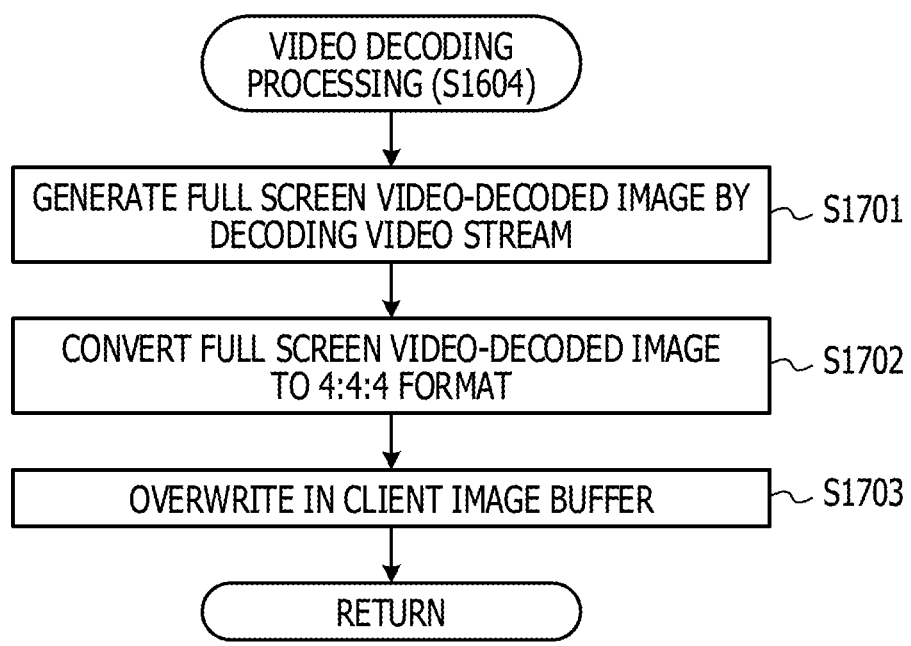
FIG. 17A is a first flowchart illustrating the details of each step in the decoding processing.

At first, the details of step S1604 (video decoding processing) and step S1605 (still-image decoding processing) will be described. FIG. 17A is a first flowchart illustrating the details of each step in the decoding processing, which indicates the details of step S1604 (video decoding processing). As illustrate in FIG. 17A, in step S1701, the full screen video decoding unit 1530 generates a full screen video-decoded image by decoding the video stream.

In step S1702, the color difference conversion unit 1533 converts the color difference format of the full screen video-decoded image to the 4:4:4 format.

In step S1703, the color difference conversion unit 1533 writes the full screen video-decoded image with the converted color difference format in the client image frame buffer 1550.

Figure 17B:
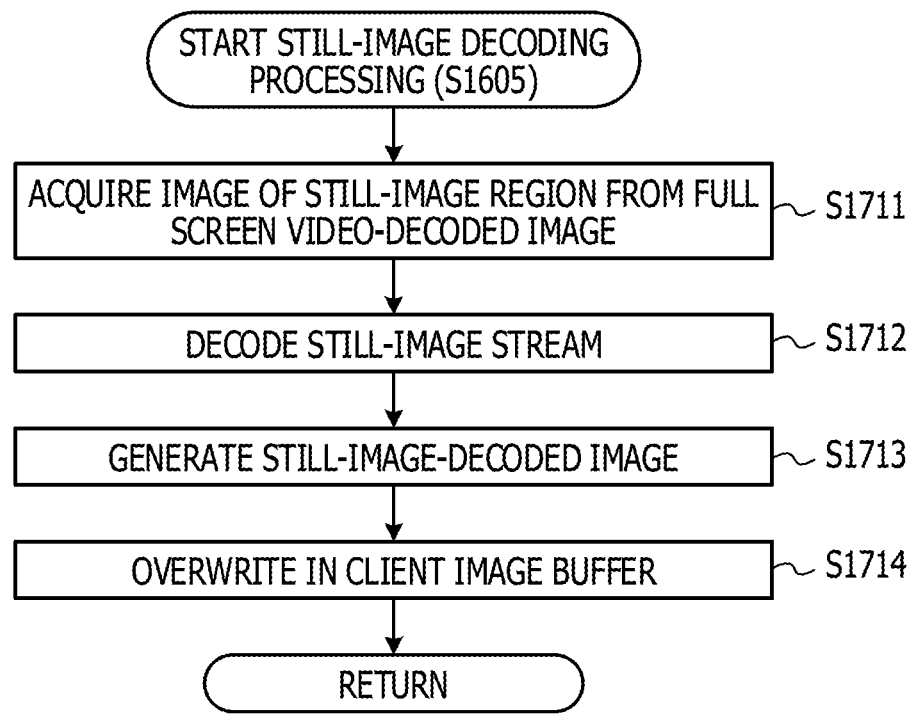
FIG. 17B is a second flowchart illustrating the details of each step in the decoding processing.

FIG. 17B is a second flowchart illustrating the details of each step in the decoding processing, which indicates the details of step S1605 (still-image decoding processing). As illustrated in FIG. 17B, in step S1711, the still-image region reference image acquisition unit 1541 reads the full screen video-decoded image held in the client image frame buffer 1550. Further, the still-image region reference image acquisition unit 1541 acquires an image in the still-image region from the full screen video-decoded image, based on the still-image region information notified by the encoding scheme acquisition unit 1513.

In step S1712, the still-image decoding unit 1540 decodes the still-image stream. In step S1713, the still-image decoding unit 1540 adds the decoded still-image stream in step S1712 to the image in the still-image region, acquired in step S1711, thereby generating a still-image-decoded image.

In step S1714, the still-image decoding unit 1540 writes the generated still-image-decoded image in the client image frame buffer 1550.

Figure 18A:
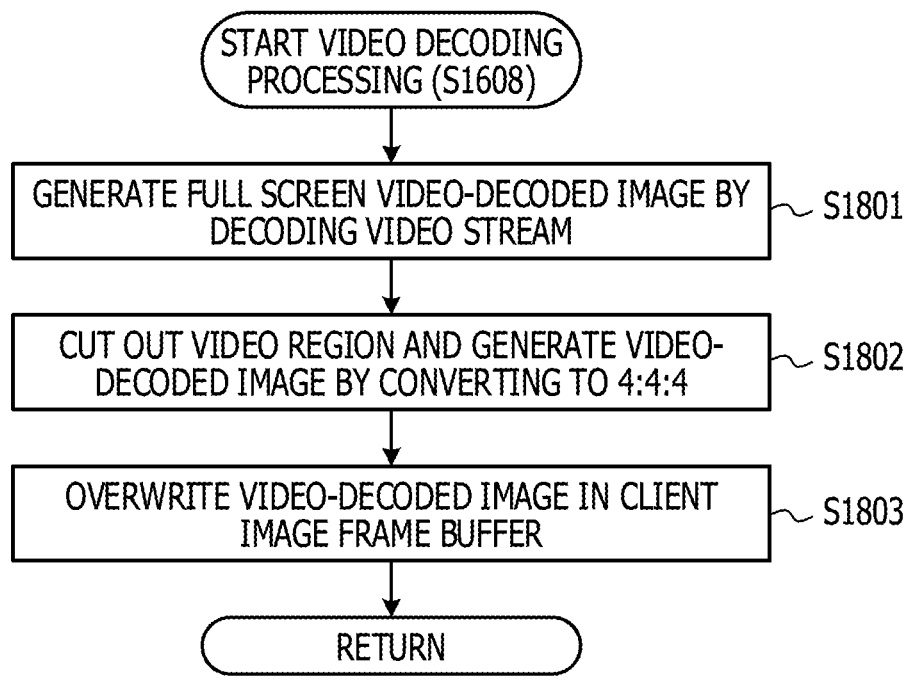
FIG. 18A is a third flowchart illustrating the details of each step in the decoding processing.

Subsequently, the details of step S1608 (video decoding processing) and step S1612 (still-image decoding processing) will be described. FIG. 18A is a third flowchart illustrating the details of each step in the decoding processing, which indicates the details of step S1608 (video decoding processing). As illustrate in FIG. 18A, in step S1801, the full screen video decoding unit 1530 generates a full screen video-decoded image by decoding the video stream using the video decoder 1420. The full screen video decoding unit 1530 writes the generated full screen video-decoded image in the full screen video-decoded image frame buffer 1531.

In step S1802, the video-region cutout unit 1532 cuts out an image at a position of the video region from the full screen video-decoded image, based on the video region information notified by the encoding scheme acquisition unit 1513. The color difference conversion unit 1533 converts the color difference format of the cut-out image at the position of the video region to the 4:4:4 format, thereby generating a video-decoded image.

In step S1803, the color difference conversion unit 1533 writes the generated video-decoded image in the client image frame buffer 1550.

Figure 18B:
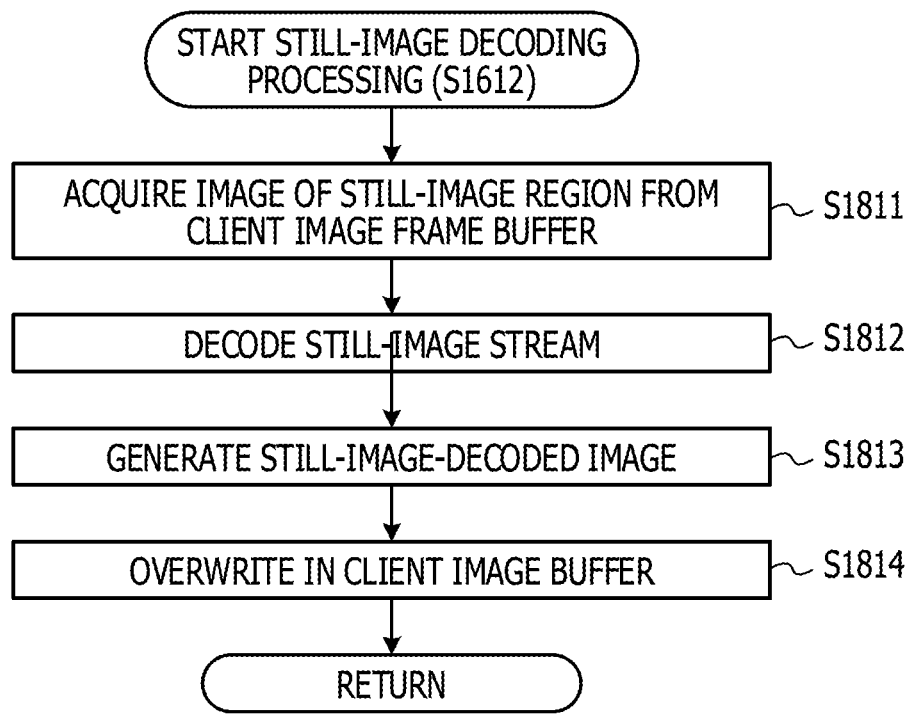
FIG. 18B is a fourth flowchart illustrating the details of each step in the decoding processing.

FIG. 18B is a fourth flowchart illustrating the details of each step in the decoding processing, which indicates the details of step S1612 (still-image decoding processing). As illustrated in FIG. 18B, in step S1811, the still-image region reference image acquisition unit 1541 reads a decoded image of an (n−1)-th frame, held in the client image frame buffer 1550. Further, the still-image region reference image acquisition unit 1541 acquires an image in the still-image region from the decoded image of the (n−1)-th frame, based on the still-image region information notified by the encoding scheme acquisition unit 1513.

In step S1812, the still-image decoding unit 1540 decodes the still-image stream. In step S1813, the still-image decoding unit 1540 adds the decoded still-image stream in step S1812 to the image in the still-image region, acquired in step S1811, thereby generating a still-image-decoded image.

In step S1814, the still-image decoding unit 1540 writes the generated still-image-decoded image in the client image frame buffer 1550.

As apparent from the descriptions, in the first embodiment, the encoding unit 342:—generates the video stream by performing the video encoding on the entire frame image using the video encoder when the video region is included in the acquired frame image;—generates the line-drawing stream by performing the line-drawing encoding on the line-drawing region using the line-drawing encoder when the line-drawing region is included in the acquired frame image; and—replaces the image at the position of the line-drawing region in the frame image with the image at the corresponding position in the frame image before the line-drawing region is generated upon encoding the entire frame image using the video encoder, when the video region and the line-drawing region are included in the acquired frame image.

Thereby, according to the encoding unit 342, the video encoder and the line-drawing encoder are able to avoid to encode the same line-drawing region even when the video region and the line-drawing region are included in the frame image.

Therefore, according to the first embodiment, it is possible to suppress increase in the information volume upon encoding the frame image including the video region and the line-drawing region.

In the first embodiment, the description is made under the assumption that the image in the line-drawing region is changed (that is, the region is the video region and the line-drawing region). However, the present disclosure is not limited to such an assumption; the image in the line-drawing region may be not changed (that is, the region may be the still-image region and the line-drawing region).

Even in such a case, the line-drawing processing unit 902 of the encoding unit 342 may have the same function as that of the still-image processing unit 903 in order to suppress increase in the information volume upon performing the line-drawing encoding on the line-drawing region using the line-drawing encoder 430.

In other words, the line-drawing processing unit 902 may generate a line-drawing difference image from difference between the line-drawing-decoded image and the line-drawing-decoded image of the immediately preceding frame, and the line-drawing encoder 430 may perform the line-drawing encoding on the generated line-drawing difference image.

In the first and second embodiments, the encoding unit 342 is applied to the virtual desktop server 110. However, the encoding unit 342 is not limited to be applied to the virtual desktop server 110, but may be applied to a random encoding device for performing the encoding processing in the screen transfer system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding device comprising:
    a memory; and
    a processor coupled to the memory and the processor configured to:
        extract a first line-drawing region which indicates a line drawing, from a first image in a plurality of images, by replacing the first line-drawing region of the first image with an image which is included in a second image preceding the first image in the plurality of images and corresponds to the first line-drawing region, generate a third image,
        generate video encoding information by performing a video encoding processing based on the third image,
        generate line-drawing encoding information which indicates encoding information of the first line-drawing region, by performing a line-drawing encoding processing based on the first line-drawing region,
        transmit the video encoding information and the line-drawing encoding information to a decoding device,
        determine whether a second line-drawing region is included in a fourth image following the first image in the plurality of images, the video encoding processing being performed based on the fourth image when the second line-drawing region is not included in the fourth image,
        store, by overwriting, the third image on the second image stored in a buffer, and
        generate a fifth image by replacing the second line-drawing region of the fourth image with an image which is included in the third image stored in the buffer and corresponds to the second line-drawing region when the second line-drawing region is included in the fourth image, and
    the video encoding processing is performed based on the fifth image when the second line-drawing region is included in the fourth image.

2. The encoding device according to claim 1, wherein the processor is further configured to store, by overwriting, the fourth image on the third image stored in the buffer when the second line-drawing region is not included in the fourth image.

3. The encoding device according to claim 1, wherein the processor is further configured to store, by overwriting, the fifth image on the third image stored in the buffer when the second line-drawing region is included in the fourth image.

4. An encoding method comprising:
    extracting a first line-drawing region which indicates a line drawing, from a first image in a plurality of images;
    by replacing the first line-drawing region of the first image with an image which is included in a second image preceding the first image in the plurality of images and corresponds to the first line-drawing region, generating a third image;
    generating video encoding information by performing a video encoding processing based on the third image;
    generating line-drawing encoding information which indicates encoding information of the first line-drawing region, by performing a line-drawing encoding processing based on the first line-drawing region;
    transmitting the video encoding information and the line-drawing encoding information to a decoding device;
    determining whether a second line-drawing region is included in a fourth image following the first image in the plurality of images, the video encoding processing being performed based on the fourth image when the second line-drawing region is not included in the fourth image;
    storing, by overwriting, the third image on the second image stored in a buffer; and
    generating a fifth image by replacing the second line-drawing region of the fourth image with an image which is included in the third image stored in the buffer and corresponds to the second line-drawing region when the second line-drawing region is included in the fourth image, the video encoding processing is performed based on the fifth image when the second line-drawing region is included in the fourth image.

5. The encoding method according to claim 4, further comprising:

storing, by overwriting, the fourth image on the third image stored in the buffer when the second line-drawing region is not included in the fourth image.

6. The encoding method according to claim 4, further comprising:

storing, by overwriting, the fifth image on the third image stored in the buffer when the second line-drawing region is included in the fourth image.

* * * * *